(12) United States Patent
Müller

(10) Patent No.: US 7,742,959 B2
(45) Date of Patent: Jun. 22, 2010

(54) FILTERING OF HIGH FREQUENCY TIME SERIES DATA

(76) Inventor: Ulrich A. Müller, Seefeldstrasse 239, 8008 Zurich (CH)

( * ) Notice: Subject to any disclaimer, the term of this patent is extended or adjusted under 35 U.S.C. 154(b) by 1684 days.

(21) Appl. No.: 09/842,440

(22) Filed: Apr. 26, 2001

(65) Prior Publication Data

US 2002/0010663 A1 Jan. 24, 2002

Related U.S. Application Data

(60) Provisional application No. 60/200,742, filed on May 1, 2000, provisional application No. 60/200,743, filed on May 1, 2000, provisional application No. 60/200,744, filed on May 1, 2000, provisional application No. 60/274,174, filed on Mar. 8, 2001.

(51) Int. Cl.
 *G06Q 40/00* (2006.01)
(52) U.S. Cl. ...................................................... 705/35
(58) Field of Classification Search ............... 705/36 R, 705/35–38
 See application file for complete search history.

(56) References Cited

U.S. PATENT DOCUMENTS

| 5,109,475 | A | * | 4/1992 | Kosaka et al. ................. 706/19 |
| 5,444,819 | A | * | 8/1995 | Negishi ......................... 706/21 |
| 5,987,432 | A | * | 11/1999 | Zusman et al. ................. 705/35 |
| 6,012,042 | A | * | 1/2000 | Black et al. ................. 705/36 R |
| 6,185,567 | B1 | * | 2/2001 | Ratnaraj et al. ................ 707/10 |
| 6,381,554 | B1 | * | 4/2002 | Matsuo et al. ................. 702/174 |
| 6,384,748 | B1 | * | 5/2002 | Asherman et al. .............. 341/83 |
| 6,415,268 | B1 | * | 7/2002 | Korisch ..................... 705/36 R |
| 6,536,935 | B2 | * | 3/2003 | Parunak et al. ................. 700/99 |

OTHER PUBLICATIONS

Bilson, Gretchen. "Adapting Formal Testing Technique for Windows Applications." Microsoft Systems Journal., v7, n1, p. 77(20), Jan.-Feb. 1992. pp. 1-10.*
Rothman, Philip. "Nonlinear Time Series Analysis of Economic and Financial Data.", Kluwer Academic Publishers, 1999.*
Wood, Robert A., "Market Microstructure Research Databases: History and Projections". Journal of Business & Economic Statistics. Alexandria: Apr. 2000. vol. 18, Iss. 2; p. 140, (8 pages).*
Powell, Mark. "Garbage In . . . Garbage Out". Petroleum Econcomist. London: Feb. 2000. vol. 67, Iss. 2; p. 28 (4 pages).*
Dacorogna, Michel M., Ulrich A. Muller, Oliver V. Pictet, Casper G. DeVries. "The Distribution of External Foreign Exchange Rate Returns in Extremely Large Data Sets". O& A Research Group. Jun. 28, 1995.*

(Continued)

*Primary Examiner*—James P Trammell
*Assistant Examiner*—Elda Milef
(74) *Attorney, Agent, or Firm*—Ward & Olivo

(57) ABSTRACT

The present invention is a method and apparatus for filtering high frequency time series data using a variety of techniques implemented on a computer. The techniques are directed to detecting and eliminating data errors such as the decimal error, monotonic series of quotes, long series of repeated quotes, scaling changes, and domain errors. Further, by means of comparison with nearby quotes in the time series, the techniques are also able to evaluate the credibility of the quotes.

36 Claims, 4 Drawing Sheets

OTHER PUBLICATIONS

Savitch, Walter. "Problem Solving With C++". Addison Wesley Longman, Inc. 1999. p. 364 (3 pages).*

Tsay, Ruey S. "Editor's Introduction to Panel Discussion On Analysis of High-Frequency Data". Journal of Business & Economic Statistics. Alexandria: Apr. 2000, vol. 18, Iss. 2 p. 139 (1 page).*

Dacorogna M.M., Müller U.A., Nagler R.J., Olsen R.B., and Pictet O.V., 1993, "A Geographical Model for the Daily and Weekly Seasonal Volatility in the FX Market," *Journal of International Money and Finance*, 12(4), 413-438.

Guillaume D.M., Dacorogna M.M., Davè R.D., Müller U.A., Olsen R.B., and Pictet O.V., 1997, "From the Bird's Eye to the Microscope: A Survey of New Stylized Facts of the Intra-Daily Foreign Exchange Markets," *Finance and Stochastics*, 1, 95-129.

Morgan Guaranty, 1996, "RiskMetrics™—Technical Document," *Morgan Guaranty Trust Company of New York*, N.Y., 4th edition.

Müller U.A., Dacorogna M.M., and Pictet O.V., 1998, "Heavy Tails in High-Frequency Financial Data," published in the book *A Practical Guide to Heavy Tails: Statistical Techniques for Analysing Heavy Tailed Distributions*, edited by Robert J. Adler, Raisa E. Feldman and Murad S. Taqqu and published by Birkhäuser, Boston 1998, 55-77.

Müller, Ulrich A., Michael Dacorogna, Richard B. Olsen, Olivier V. Pictet, Matthias Schwartz and Claude Morgenegg, "Statistical Study of Foreign Exchange Rates, Empirical Evidence of a Price Change Scaling Law, and Intraday Analysis", *Journal of Banking & Finance*, 14 (1990) 1189-1208. North-Holland.

* cited by examiner

| Date | Central European Time | Price bid | ask | Reuters bank code | O&A filter diagnosis |
|---|---|---|---|---|---|
| 08.01.97 | 10:06:54 | 1.5668 | 1.5673 | ICCR | ok |
| 08.01.97 | 10:06:54 | 1.5667 | 1.5670 | INGV | ok |
| 08.01.97 | 10:06:56 | 1.5667 | 1.5672 | BPPB | ok |
| 08.01.97 | 10:07:00 | 1.5666 | 1.5671 | NWNC | ok |
| 08.01.97 | 10:07:02 | 1.5652 | 1.5659 | RABO | BAD QUOTE |
| 08.01.97 | 10:07:04 | 1.5666 | 1.5671 | DDBX | ok |
| 08.01.97 | 10:07:06 | 1.5664 | 1.5674 | DRE1 | ok |
| 08.01.97 | 10:07:14 | 1.5668 | 1.5673 | SOGE | ok |
| 08.01.97 | 10:07:14 | 1.5668 | 1.5671 | INGV | ok |
| 08.01.97 | 10:07:14 | 1.5667 | 1.5672 | UBNX | ok |
| 08.01.97 | 10:07:18 | 1.5665 | 1.5675 | MMDB | ok |
| 08.01.97 | 10:07:18 | 1.5670 | 1.5675 | ICCR | ok |
| 08.01.97 | 10:07:20 | 1.5665 | 1.5672 | RABO | ok |
| 08.01.97 | 10:07:22 | 1.5668 | 1.5673 | DDBX | ok |
| 08.01.97 | 10:07:24 | 1.5667 | 1.5672 | SOGE | ok |
| 08.01.97 | 10:07:24 | 1.5669 | 1.5674 | ICCR | ok |
| 08.01.97 | 10:07:26 | 1.5651 | 1.5661 | HYPO | BAD QUOTE |
| 08.01.97 | 10:07:26 | 1.5665 | 1.5670 | BANK | ok |
| 08.01.97 | 10:07:30 | 1.5658 | 1.5668 | ROMC | ok |
| 08.01.97 | 10:07:30 | 1.5665 | 1.5670 | BCIX | ok |
| 08.01.97 | 10:07:34 | 1.5666 | 1.5676 | BGFX | ok |
| 08.01.97 | 10:07:34 | 1.5667 | 1.5672 | DDBX | ok |
| 08.01.97 | 10:07:38 | 1.5665 | 1.5670 | SOGE | ok |
| 08.01.97 | 10:07:38 | 1.5652 | 1.5659 | RABO | BAD QUOTE |
| 08.01.97 | 10:07:48 | 1.5666 | 1.5671 | SOGE | ok |
| 08.01.97 | 10:07:48 | 1.5667 | 1.5670 | IMBM | ok |
| 08.01.97 | 10:07:50 | 1.5664 | 1.5667 | RZBA | ok |
| 08.01.97 | 10:07:58 | 1.5666 | 1.5671 | DDBX | ok |
| 08.01.97 | 10:07:58 | 1.5668 | 1.5673 | BSFJ | ok |

FILTERING OF HIGH FREQUENCY TIME SERIES DATA

CROSS-REFERENCE TO RELATED APPLICATIONS

This application claims priority to U.S. Provisional Application No. 60/200,742, filed May 1, 2000; U.S. Provisional Application No. 60/200,743, filed May 1, 2000; U.S. Provisional Application No. 60/200,744, filed May 1, 2000; and U.S. Provisional Application No. 60/274,174, filed Mar. 8, 2001. The contents of the above applications are incorporated herein in their entirety by reference.

FIELD OF THE INVENTION

This invention relates to filtering of high frequency time series data. It is particularly applicable to the filtering of time series financial data and, for convenience, will be described in that context.

BACKGROUND OF THE INVENTION

A time series is a time-ordered sequence of data. A financial time series is a time-ordered sequence of financial data, typically a sequence of quotes for a financial instrument. These data should be homogeneous. Homogeneity means that the quotes of a series are of the same type and the same market; they may differ in the origins of the contributors, but should not differ in important parameters such as the maturity (of interest rates, . . . ) or the moneyness (of options or their implied volatilities). The filter user is responsible for ensuring data homogeneity.

All quotes have the following general structure:
1. A time stamp. This is the time of the data collection, the arrival time of the real-time quote in the collector's environment. Time stamps are monotonically increasing over the time series. We might also have other time stamps (e.g. the reported time of the original production of the quote). Such a secondary time stamp would however be considered as side information (see item 4 immediately below) rather than a primary time stamp.
2. Information on the quote level. There are different types of level information as markets and sources are different in nature and also differently organized. Some level information can be termed "price", some other information such as transaction volume figures cannot. Some non-prices such as implied volatility quotes can be treated as prices with bid and ask quotes. A neutral term such as "level" or "filtered variable" is therefore preferred to "price". In the case of options, the price might be first converted to an implied volatility which is then the filtered variable. Different quoting types require different filtering approaches. This is discussed below.
3. Information on the origin of the quote: information provider, name of exchange or bank, city, country, time zone, . . . . In the filtering algorithm, we only need one function to compare two origins. This will be used when judging the independence and credibility of quotes as explained in further sections. A further analysis of bank names or other IDs is not really needed.
4. Side information: everything that does not fall into one of the three aforementioned categories, e.g. a second time stamp. This is ignored by filtering.

The information on the quote levels is organized in different structures depending on the market and the source. Some important cases are listed here:

single-valued quotes: each quote has only one value describing its level. Example: stock indices.

bid-ask quotes: each quote has a bid value and an ask value. Example: foreign exchange (FX) spot rates.

bid or ask quotes: each quote has a bid or an ask value, often in unpredictable sequence. This can be regarded as two different single-valued time series. Example: quotes on some exchanges.

bid or ask or transaction quotes: each quote has a bid value or an ask value or a transaction value. Again, this can be regarded as three different single-valued time series. Example: the data stream from the major short-term interest rate futures exchanges also includes transaction data.

middle quotes: in certain cases, we only obtain a time series of middle quotes with are treated as single-valued quotes. The case of getting only transaction quotes (no bid, no ask) is technically identical. Also transaction volume figures are treated as single-valued quotes, for example.

OHLC quotes: open/high/low/close. An OHLC filter can be made in analogy to the bid-ask filter, with some tests of the whole quote followed by quote splitting as to be explained.

We recognize a data error as being present if a piece of quoted data does not conform to the real situation of the market. We have to identify a price quote as being a data error if it is neither a correctly reported transaction price nor a possible transaction price at the reported time. In the case of indicative prices, however, we have to tolerate a certain transmission time delay.

There are many causes for data errors. The errors can be separated in two classes:
1. human errors: errors directly caused by human data contributors, for different reasons:
   (a) unintentional errors, e.g. typing errors;
   (b) intentional errors, e.g. dummy quotes produced just for technical testing;
2. system errors: errors caused by computer systems, their interactions and their failures.

Strictly speaking, system errors are also human errors because human operators have the ultimate responsibility for the correct operation of computer systems. However, the distance between the data error and the responsible person is much larger for system errors.

In many cases, it is impossible to find the exact reason for the data error even if the quote is very aberrant. The task of the filter is to identify such outliers, whatever the reason.

Sometimes the cause of the error can be guessed from the particular behavior of the bad quotes. This knowledge of the error mechanism can help to improve filtering and, in some cases, correct the bad quotes.

Examples of some of the errors to be expected are as follows:
1. Decimal errors: Failure to change a "big" decimal digit of the quote. Example: a bid price of 1.3498 is followed by a true quote 1.3505, but the published, bad quote is 1.3405. This error is most damaging if the quoting software is using a cache memory somewhere. The wrong decimal digit may stay in the cache and cause a long series of bad quotes. For Reuters page data, this was a dominant error type around 1988! Nowadays, this error type seems to be rare.
2. "Test" quotes: Some data contributors sometimes send test quotes to the system, usually at times when the market is not liquid. These test quotes can cause a lot of damage because they may look plausible to the filter, at least initially. Two important examples:

"Early morning test": A contributor sends a bad quote very early in the morning, in order to test whether the connection to the data distributor (e.g. Reuters) is operational. If the market is inactive overnight, no trader would take this test quote seriously. For the filter, such a quote may be a major challenge. The filter has to be very critical to first quotes after a data gap.

Monotonic series: Some contributors test the performance and the time delay of their data connection by sending a long series of linearly increasing quotes at inactive times such as overnight or during a weekend. For the filter, this is hard to detect because quote-to-quote changes look plausible. Only the monotonic behavior in the long run can be used to identify the fake nature of this data.

3. Repeated quotes: Some contributors let their computers repeat the last quote in more or less regular time intervals. This is harmless if it happens in a moderate way. In some markets with high granularity of quoting (such as Eurofutures), repeated quote values are quite natural. However, there are contributors that repeat old quotes thousands of times with high frequency, thereby obstructing the filtering of the few good quotes produced by other, more reasonable contributors.

4. Quote copying: Some contributors employ computers to copy and re-send the quotes of other contributors, just to show a strong presence on the data feed. Thus, they decrease the data quality, but there is no reason for a filter to remove copied quotes that are on a correct level. Some contributors run programs to produce slightly modified copied quotes by adding a small random correction to the quote. Such slightly varying copied quotes are damaging because they obstruct the clear identification of fake monotonic or repeated series made by other contributors.

5. Scaling problem: Quoting conventions may differ or be officially redefined in some markets. Some contributors may quote the value of 100 units, others the value of 1 unit. The filter may run into this problem "by surprise" unless a very active filter user anticipates all scale changes in advance and preprocesses the data accordingly.

Filtering of high-frequency time-series data is a demanding, often underestimated task. It is complicated because of
  the variety of possible errors and their causes;
  the variety of statistical properties of the filtered variables (distribution functions, conditional behavior, non-stationarity and structural breaks);
  the variety of data sources and contributions of different reliability;
  the irregularity of time intervals (sparse/dense data, sometimes long data gaps over time);
  the complexity and variety of the quoted information: transaction prices, indicative prices, FX forward premia (where negative values are allowed), interest rates, prices and other variables from derivative markets, transaction volumes, . . . ; bid/ask quotes vs. single-valued quotes;
  the necessity of real-time filtering: producing instant filter results before seeing any successor quote.

There are different possible approaches to filtering. Some guidelines determine our approach:
  Plausibility: we do not know the real cause of data errors with rare exceptions (e.g. the decimal error). Therefore we judge the validity or credibility of a quote according to its plausibility, given the statistical properties of the series.
  We need a whole neighborhood of quotes for judging the credibility of a quote: a filtering window. A comparison to only the "last valid" quote of the series is not enough. The filtering window can grow and shrink with data quality and the requirements for arriving at a good filtering decision.
  The statistical properties of the series needed to measure the plausibility of a quote are determined inside the filtering algorithm rather than being hand-configured. The filter is thus adaptive.
  Quotes with complex structures (i.e. bid/ask or open/high/low/close) are split into scalar variables to be filtered separately. These filtered variables may be derived from the raw variables, e.g. the logarithm of a bid price or the bid-ask spread. Quote splitting is motivated by keeping the algorithm modular and overseeable. Some special error types may also be analyzed for full quotes before splitting.
  Numerical methods with convergence problems (such as non-linear minimization) are not used. Such methods would probably lead to problems as the filter is exposed to very different situations. The chosen algorithm produces unambiguous results.
  The filter needs a high execution speed; computing all filtering results from scratch with every new quote would not be efficient. The chosen algorithm is iterative: when a new quote is considered, the filtering information obtained from the previous quotes is re-used; only a minimal number of computations concerning the new quote is added.
  The filter has two modes: real-time and historical. Thanks to the filtering window technique, both modes can be supported by the same filter run. In historical filtering, the final validation of a quote is delayed to a time after having seen some successor quotes.

SUMMARY OF THE INVENTION

The present invention is a method and apparatus for filtering high frequency time series data using a variety of techniques implemented on a computer. The techniques are directed to detecting and eliminating data errors such as the decimal error, monotonic series of quotes, long series of repeated quotes, scaling changes, and domain errors. Further, by means of comparison with nearby quotes in the time series, the techniques are also able to evaluate the credibility of the quotes.

BRIEF DESCRIPTION OF THE DRAWINGS

These and other objects, features and advantages of the invention will be more readily apparent from the following detailed description of the invention in which:

FIG. 3 depicts illustrative time series data;

DETAILED DESCRIPTION OF THE INVENTION

Figure 1:
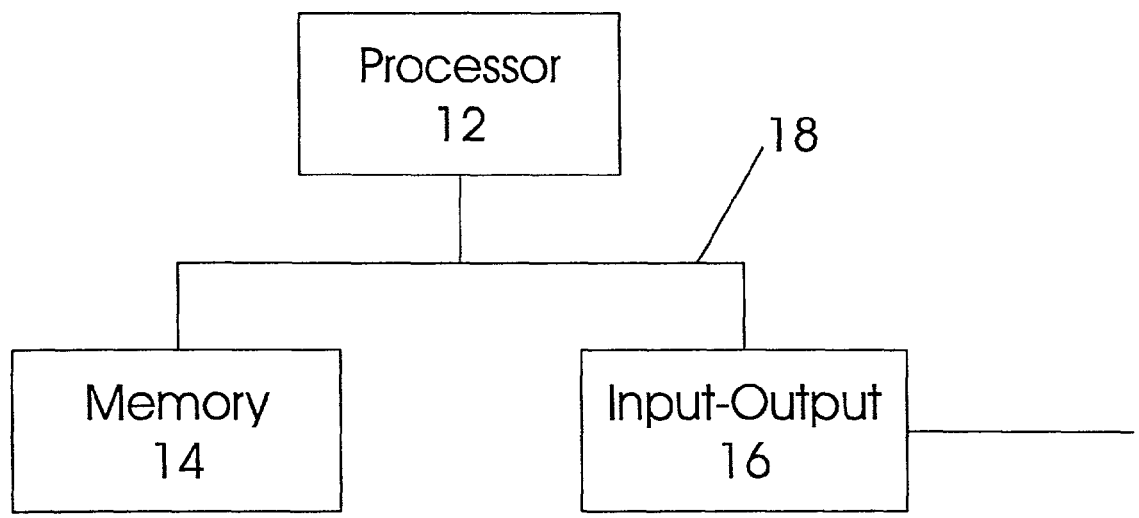
FIG. 1 is a schematic illustration of a conventional computer used in the practice of the invention.

Illustrative apparatus for practicing the invention is a general purpose computer 10 such as that schematically illustrated in FIG. 1. As shown therein, the computer comprises a processor 12, a memory 14, input-output means 16 and a communications bus 18 interconnecting the processor, the memory and the input-output means. The memory typically includes both high-speed semiconductor memory for temporary storage of programs and data as well as magnetic disk or tape storage media for long-term storage of programs and data. Illustrative computers used in the practice of the invention include both main frame computers and high-speed personal computers such as those supplied by IBM Corporation. Illustrative long-term storage systems include large disk arrays such as those supplied by EMC Corporation. Illustrative input-output means comprise one or more data feeds from communication links such as telecommunication lines and/or the Internet, a display, a printer, and a keyboard.

Figure 2:
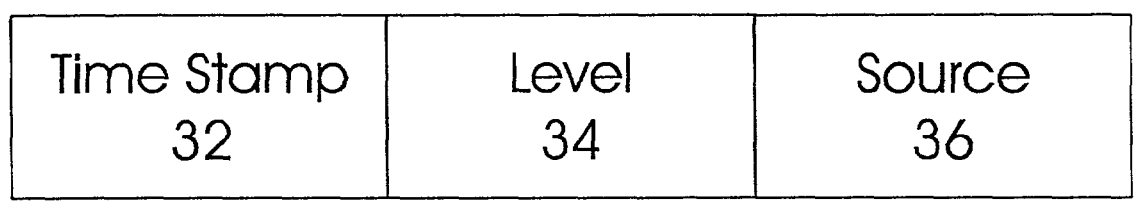
FIG. 2 is an illustration of the format of the time series data processed by the invention.

Time series data is supplied to input-output means 16 of the computer over one or more communication links such as telecommunication lines or the Internet. The data has the general format illustrated in FIG. 2 comprising a time stamp 32, a level 34, and a source 36.

A sample of the time series data is illustrated in FIG. 3. As indicated, time stamp 32 includes both date information of 08.01.97 and time information related to events a little after 10 o'clock. The time stamp increases monotonically. The level information 34 is bid-ask price data. The source information 36 is a variety of banks identified by a four character code.

The received time series data is processed by the filter of the present invention to determine if the data is good or bad. The result of this process can simply be an output stream of only the good data in the same order as the data was received. Alternatively, as shown in FIG. 3, the output can be the received time series data along with information 38, that indicates the filter's evaluation of each item of time series data.

Information 38 can be a number (e.g., on a scale of 0 to 1) that assesses the credibility of an item of data or simply, as shown in FIG. 3, an indication that the item of data is good or bad.

Before explaining the many details of the filter, we provide a description of the functionality of the filter from the user's perspective as well as its basic internal structure.

The filter has the capability of performing the following operations:
It is fed by financial quotes in the ordered sequence of their time stamps.
It delivers the filtering results of the same quotes in the same ordered sequence; for each quote:
the credibility of the quote between 0 (totally invalid) and 1 (totally valid), also for individual elements such as bid or ask prices or the bid-ask spread;
the value(s) of the quote, whose errors can possibly be corrected in some cases where the error mechanism is well known;
the filtering reason, explaining why the filter has rejected (or corrected) the quote.

Special filter users may want to use all these filtering results, e.g. for filter testing purposes. Normal users may use only those (possibly corrected) quotes with a credibility exceeding a threshold value (which is often chosen to be 0.5). and ignore all invalid quotes and all side results of the filter such as the filtering reason.

The timing of the filter operations is non-trivial. In real-time operation, a per-quote result is produced right after the corresponding quote has entered the filter. In historical operation, the user can see a per-quote result only after the filter has seen a few newer quotes and adapted the credibility of older quotes accordingly.

The filter needs a build-up period as specified by section 6.1. This is natural for an adaptive filter. If the filtering session starts at the first available quote (database start), the build-up means to run the filter for a few weeks from this start, storing a set of statistical variables in preparation for restarting the filter from the first available quote. The filter will then be well adapted because it can use the previously stored statistical variables. If the filtering session starts at some later point in the time series, the natural build-up period is the period immediately preceding the first quote of the session.

The filtering algorithm can be seen as one whole block that can be used several times in a data flow, also in series. Examples:
Mixing already filtered data streams from several sources where the mixing result is again filtered. The danger is that the combined filters reject too many quotes, especially in the real-time filtering of fast moves (or price jumps).
Filtering combined with computational blocks: raw data→filter→computational block→filter→application. Some computational blocks such as cross rate or yield curve computations require filtered input and produce an output that the user may again want to filter.

Repeated filtering in series is rather dangerous because it may lead to too many rejections of quotes. If it cannot be avoided, only one of the filters in the chain should be of the standard type. The other filter(s) should be configured to be weak, i.e. they should eliminate not more than the totally aberrant outliers.

a. Overview of the Filtering Algorithm and its Structure

The filtering algorithm is structured in a hierarchical scheme of sub-algorithms. Table 1 gives an overview of this structure. The filter is univariate, it treats only one financial instrument at a time. Of course, we can create many filter objects for many instruments, but these filters do not interact with each other.

However, we can add a higher hierarchy level at the top of Table 1 for multivariate filtering. A multivariate filter could coordinate several univariate filters and enhance the filtering of sparse time series by using information from well-covered instruments. This is discussed in section 5.4.

Details of the different algorithmic levels are explained in the next sections. The sequence of these sections follows Table 1, from bottom to top.

TABLE I (The basic structure of the filtering algorithm)

| hierarchy level | name of the level | purpose, description |
|---|---|---|
| 1 | univariate filter | The complete filtering of one time series: passing incoming quotes to the analysis of the lower hierarchy levels; managing the filter results of the lower hierarchy levels and packaging these results into the right output format of the filter; supporting real-time and historical filtering; supporting one or more filtering hypothesis, each with |

TABLE I-continued (The basic structure of the filtering algorithm)

| hierarchy level | name of the level | purpose, description |
|---|---|---|
| | | its own full-quote filtering window. |
| 2 | full-quote filtering window | A sequence of recent full quotes, some of the possibly corrected according to a general filtering hypothesis. Tasks: quote splitting (the most important task): splitting full quotes (such as bid/ask) into scalar quotes to be filtered individually in their own scalar filtering windows; a basic validity test (e.g. whether prices are in the positive domain); a possible mathematical transformation (e.g.: logarithm); all those filtering steps that require full quotes (not just bid or ask quotes alone) are done here. |
| 3 | scalar filtering window | A sequence of recent scalar quotes whose credibilities are still in the process of being modified. Tasks: testing new, incoming scalar quotes; comparing a new scalar quote to all older quotes of the window (using a special business time scale and a dependence analysis of quote origins); computing a first (real-time) credibility of the new scalar quote; modifying the credibilities of older quotes based on the information gained from the new quote; dismissing the oldest scalar quote when its credibility is finally settled; updating the statistics with sufficiently credible scalar quotes when they are dismissed from the window. |

Figure 4:
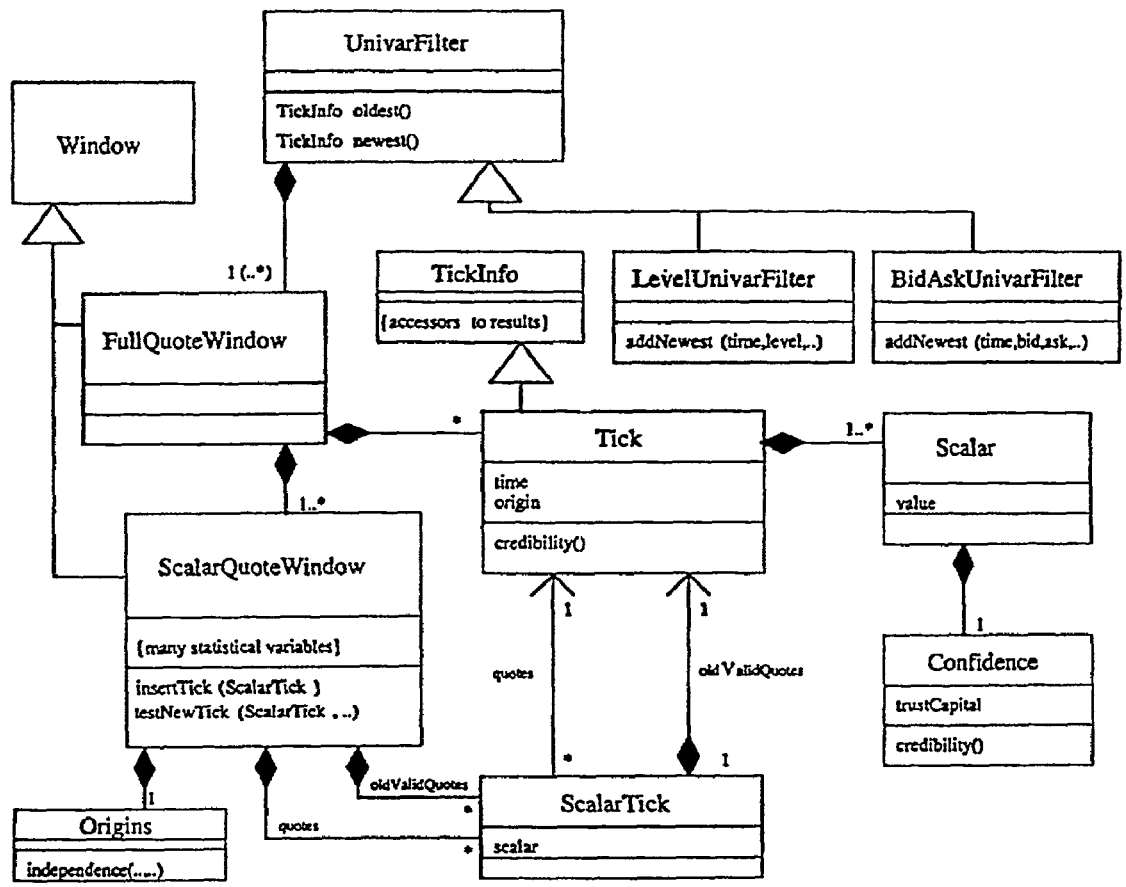
FIG. 4 is a UML diagram of an illustrative implementation of the filter of the present invention.

In FIG. 4, the structure of the filter is also shown in the form of a UML class diagram. UML diagrams (the standard in object-oriented software development) are explained in (Fowler and Scott, 1997), for example. The same filter technology might also be implemented slightly different from FIG. 4.

The three hierarchy levels of Table 1 can be found again in FIG. 4: (1) the univariate filter (UnivarFilter), (2) the full-quote filtering window (FullQuoteWindow) and (3) the scalar filtering window (ScalarQuoteWindow). Note that the word "tick" is just a synonym of the term "quote". The filter as explained in this specification is much richer than the class structure shown in FIG. 4. The filter also contains some special elements such as a filters for monotonic fake quotes or scaled quotes. The description of these special filter elements may be found in section 5, following the main filter description. However, everything fits into the main structure given by Table 1 and FIG. 4. We recommend that the reader repeatedly consult this table and this figure in order to gain an overview of the whole algorithm while reading the next sections.

1. Basic Filtering Elements and Operations

The first element to be discussed in a bottom-to-top specification is the scalar filtering window. Its position in the algorithm is shown in FIG. 4 (class ScalarQuoteWindow). Window filtering relies on a number of concepts and operations that are presented even before discussing the management of the window.

The basic filtering operations see the quotes in the simplified form of scalar quotes consisting of:

1. the time stamp,
2. one scalar variable value to be filtered (e.g. the logarithm of a bid price), here denoted by x,
3. the origin of the quote.

The basic operations can be divided into two types:

1. Filtering of single scalar quotes: considering the credibility of one scalar quote alone. An important part is the level filter where the level of the filtered variable is the criterion.
2. Pair filtering: comparing two scalar quotes. The most important part is the change filter that considers the change of the filtered variable from one quote to another one. Filtering depends on the time interval between the two quotes and the time scale on which this is measured. Pair filtering also includes a comparison of quote origins.

The basic filtering operations and another basic concept of filtering, credibility, are presented in the following sections. Their actual application in the larger algorithm is explained later, starting from section 2.

a. Credibility and Trust Capital

Credibility is a central concept of the filtering algorithm. It is expressed by a variable C taking values between 0 and 1, where 1 indicates certain validity and 0 certain invalidity. This number can be interpreted as the probability of a quote being valid according to a certain arbitrary criterion. For two reasons, we avoid the formal introduction of the term "probability". First, the validity of a quote is a fuzzy concept; e.g. slightly deviating quotes of an over-the-counter spot market can perhaps be termed valid even if they are very unlikely to lead to a real transaction. Second, we have no model of probability even if validity could be exactly defined. Credibility can be understood as a "possibility" in the sense of fuzzy logic (Zimmermann, 1985).

Credibility is not additive: the credibility of a scalar quote gained from two tests is not the sum of the credibilities gained from the individual tests. This follows from the definition of credibility between 0 and 1. The sum of two credibilities of, say, 0.75 would be outside the allowed domain.

For internal credibility computations, it is useful to define an additive variable, the trust capital T which is unlimited in value. There is no theoretical limit for gathering evidence in favor of accepting or rejecting the validity hypothesis. Full validity corresponds to a trust capital of T–∞, full invalidity to T–∞. We impose a fixed, monotonic relation between the credibility C and the trust capital T of a certain object:

$$C(T) = \frac{1}{2} + \frac{T}{2\sqrt{1+T^2}} \quad (4.1)$$

and the inverse relation $$T(C) = \frac{C - \frac{1}{2}}{\sqrt{C(1-C)}} \quad (4.2)$$

There are possible alternatives to this functional relationship. The chosen solution has some advantages in the formulation of the algorithm that will be shown later.

The additivity of trust capitals and eqs. 4.1 and 4.2 imply the definition of an addition operator for credibilities. Table 2 shows the total credibility resulting from two independent credibility values.

TABLE 2

The total credibility $C_{total}$ resulting from two independent credibility values $C_1$ and $C_2$. The function $C_{total} = C[T(C_1) + T(C_2)]$ defines an addition operator for credibilities. Eqs. 4.1 and 4.2 are applied. The values in brackets, (0.5), are in fact indefinite limit values; $C_{total}$ may converge to any value between 0 and 1.

| | $C_1 =$ | | | | |
|---|---|---|---|---|---|
| $C_{total}$ | 0 | 0.25 | 0.5 | 0.75 | 1 |
| $C2 =$ | | | | | |
| 1 | (0.5) | 1 | 1 | 1 | 1 |
| 0.75 | 0 | 0.5 | 0.75 | 0.878 | 1 |
| 0.5 | 0 | 0.25 | 0.5 | 0.75 | 1 |
| 0.25 | 0 | 0.122 | 0.25 | 0.5 | 1 |
| 0 | 0 | 0 | 0 | 0 | (0.5) | b. Filtering of Single Scalar Quotes: the Level Filter

In the O & A filter, there is only one analysis of a single quote, the level filter. Comparisons between quotes (done for a pair of quotes, treated in section 1.c immediately below) are often more important in filtering than the analysis of a single quote.

The level filter computes a first credibility of the value of the filtered variable. This is useful only for those volatile but mean-reverting time series where the levels as such have a certain credibility in the absolute sense—not only the level changes. Moreover, the timing of the mean reversion should be relatively fast. Interest rates or IR futures prices, for example, are mean-reverting only after time intervals of years; they appear to be freely floating within smaller intervals. For those rates and for other prices, level filtering is not suitable.

The obvious example for fast mean reversion and thus for using a level filter is the bid-ask spread which can be rather volatile from quote to quote but tends to stay within a fixed range of values that varies only very slowly over time. For spreads, an adaptive level filter is at least as important as a pair filter that considers the spread change between two quotes.

The level filter first puts the filtered variable value x (possibly transformed as described in section 3.c) into the perspective of its own statistical mean and standard deviation. Following the notation of (Zumbach and Müller), the standardized variable $\hat{x}$ is defined:

$$\hat{x} = \frac{x - \bar{x}}{\sqrt{MSD[\Delta\vartheta_r, 2; x]}} = \frac{x - \bar{x}}{\sqrt{EMA[\Delta\vartheta_r; (x - \bar{x})^2]}} \quad (4.3)$$

where the mean value of x is also a moving average:

$$\bar{x} = EMA[\Delta\Theta_r; x] \quad (4.4)$$

The Θ-time scale (Dacorogna et al., 1993) to be used is discussed in section 1.d. The variable $\Delta\Theta_r$ denotes the configurable range of the kernel of the moving averages and should cover the time frame of the mean reversion of the filtered variable; a reasonable value for bid-ask spreads has to be chosen. The iterative computation of moving averages is explained in (Zumbach and Müller). Here and for all the moving averages of the filtering algorithm, a simple exponentially weighted moving average (EMA) is used for efficiency reasons.

A small $|\hat{x}|$ value deserves high trust; an extreme $|\hat{x}|$ value indicates an outlier with low credibility and negative trust capital. Before arriving at a formula for the trust capital as a function of $\hat{x}$, the distribution function of $\hat{x}$ has to be discussed. A symmetric form of the distribution function is assumed at least in coarse approximation. Positive definite variables such as the bid-ask spread are quite asymmetrically distributed; this is why they must be mathematically transformed. This means that x is already a transformed variable, e.g. the logarithm of the spread as explained in section 3.c.

The amount of negative trust capital for outliers depends on the tails of the distribution at extreme (positive and negative) $\hat{x}$ values. A reasonable assumption is that the credibility of outliers is approximately the probability of exceeding the outlier value, given the distribution function. This probability is proportional to $\hat{x}^{-\alpha}$ where $\alpha$ is called the tail index of the fat-tailed distribution. We know that distribution functions of level-filtered variables such as bid-ask spreads are indeed fat-tailed. Determining the distribution function and $\alpha$ in a moving sample would be a considerable task, certainly too heavy for filtering software. Therefore, we choose an approximate assumption on $\alpha$ that was found acceptable across many rates, filtered variable types and financial instruments: $\alpha=4$. This value is also used in the analogous pair filtering tool, e.g. for price changes, and discussed in section 1.c.

For extreme events, the relation between credibility and trust capital, eq. 4.1, can be asymptotically expanded as follows:

$$C = \frac{1}{4T^2} \text{ for } T \ll -1 \quad (4.5)$$

Terms of order higher than $(1/T)^2$ are neglected here. Defining a credibility proportional to $\hat{x}^{-\alpha}$ is thus identical to defining a trust capital proportional to $\hat{x}^{\alpha/2}$. Assuming $\alpha=4$, we obtain a trust capital proportional to $\hat{x}^2$. For outliers, this trust capital is negative, but for small $\hat{x}$, the trust capital is positive up to a maximum value we define to be 1.

Now, we have the ingredients to come up with a formula that gives the resulting trust capital of the ith quote according to the level filter:

$$T_{i0} = 1 - \xi_i^2 \quad (4.6)$$

where the index 0 of $T_{i0}$ indicates that this is a result of the level filter only. The variable $\xi_i$ is x in a scaled and standardized form:

$$\xi_i = \frac{\hat{x}_i}{\xi_0} \quad (4.7)$$

with a constant $\xi_0$. Eq. 4.6 together with eq. 4.7 is the simplest possible way to obtain the desired maximum and asymptotic behavior. For certain rapidly mean-reverting variables such as hourly or daily trading volumes, this may be enough.

However, the actual implementation in the filter is for bid-ask spreads which have some special properties. Filter tests have shown that these properties have to be taken into account in order to attain satisfactory spread filter results:

Quoted bid-ask spreads tend to cluster at "even" values, e.g. 10 basis points, while the real spread may be an odd value oscillating in a range below the quoted value. A series of formal, constant spreads can therefore hide some substantial volatility that is not covered by the statistically determined denominator of eq. 4.3. We need an offset $\Delta x_{min}^2$ to account for the typical hidden volatility in that denominator. A suitable choice is $\Delta x_{min}^2$ [constant$_1$($\hat{x}$+constant$_2$)]$^2$.

High values of bid-ask spreads are worse in usability and plausibility than low spreads, by nature. Thus the quote deviations from the mean as defined by eq. 4.3 are judged in a biased way. Deviations to the high side ($\hat{x}_i$, >0) are penalized by a factor $p_{high}$ whereas no such penalty is applied against low spreads.

For some (minor) financial instruments, many quotes are posted with zero spreads, i.e. bid quote=ask quote. This is discussed in section 6.1 (and its subsections). In some cases, zero spreads have to be accepted, but we set a penalty against them as in the case of positive $\hat{x}_i$.

We obtain the following refined definition of $\xi_i$:

$$\xi_i = \begin{cases} \dfrac{\hat{x}_i}{\xi_0} & \text{if } \hat{x}_i \leq 0 \text{ and no zero-spread case} \\ p_{high}\dfrac{\hat{x}_i}{\xi_0} & \text{if } \hat{x}_i > 0 \text{ or in a zero-spread case} \end{cases} \quad (4.8)$$

where $\hat{x}_i$ comes from a modified version of eq. 4.3, $$\hat{x} = \frac{x - \bar{x}}{\sqrt{EMA[\Delta\vartheta_r; (x-\bar{x})^2] + \Delta x_{min}^2}} \quad (4.9)$$

The constant $\xi_0$ determines the size of an $\hat{x}$ that is just large enough to neither increase nor decrease the credibility.

Eq. 4.8 is general enough for all mean-reverting filterable variables. The filter of the present invention has a level filter only for bid-ask spreads. If we introduced other mean-reverting variables, a good value for $\Delta x_{min}^2$ would probably be much smaller or even 0, $p_{high}$ around one and $\xi_0$ larger (to tolerate volatility increases in absence of a basic volatility level $\Delta x_{min}^2$).

c. Pair Filtering

The pairwise comparison of scalar quotes is a central basic filtering operation. Simple filtering algorithms indeed consisted of a simple sequence of pair filtering operations: each new quote was judged only in relation to the "last valid" quote. The current filter makes more pairwise comparisons also for quotes that are not neighbors in the series as explained in section 2.

Pair filtering contains several ingredients, the most important one being the filter of variable changes. The time difference between the two quotes plays a role, so the time scale on which it is measured has to be specified. The criterion is adaptive to the statistically expected volatility estimate and therefore uses some results from a moving statistical analysis.

Another basic pair filtering operation is the comparison of the origins of the two quotes. Some data sources provide rich information about contributors, some other sources hide this information or have few contributors (or just one). The comparison of quote origins has to be seen in the perspective of the observed diversity of quote origins. Measuring this diversity (which may change over time) adds another aspect of adaptivity to the filter.

i. The Change Filter

The change filter is a very important filtering element. Its task is to judge the credibility of a variable change according to experience, which implies the use of on-line statistics and thus adaptivity. The change of the filtered variable from the jth to the ith quote is $$\Delta x_{ij} = x_i - x_j \quad (4.10)$$

The variable x may be the result of a transformation in the sense of section 3.c. The time difference of the quotes is $\Delta\Theta_{ij}$, measured on a time scale to be discussed in section 1.d.

The variable change $\Delta x$ is put into a relation to a volatility measure: the expected variance $V(\Delta\Theta)$ about zero. V is determined by the on-line statistics as described in section 1.c. The relative change is defined as follows:

$$\xi_{ij} = \frac{\Delta x_{ij}}{\xi_0 \sqrt{V(\Delta\vartheta_{ij})}} \quad (4.11)$$

with a positive constant $\xi_0$ which has a value of 5.5 in the present filter and is further discussed below. Low $|\xi|$ values deserve high trust, extreme $|\xi|$ values indicate low credibility and negative trust capital: at least one of the two compared quotes must be an outlier.

The further algorithm is similar to that of the level filter as described in section 4.2, using the relative change $\xi_{ij}$ instead of the scaled standardized variable $\xi_i$.

The amount of negative trust capital for outliers depends on the distribution function of changes $\Delta x$, especially the tail of the distribution at extreme $\Delta x$ or $\xi$ values. A reasonable assumption is that the credibility of outliers is approximately the probability of exceeding the outlier value, given the distribution function. This probability is proportional to $\xi^{-\alpha}$ where $\alpha$ is the tail index of a fat-tailed distribution. We know that distribution functions of high-frequency price changes are indeed fat-tailed. Determining the distribution function and $\alpha$ in a moving sample would be a considerable task beyond the scope of filtering software. Therefore, we make a rough assumption on $\alpha$ that is good enough across many rates, filtered variable types and financial instruments. For many price changes, a good value is around $\alpha \approx 3.5$, according to (Müller et al., 1998). As in section 4.2, we generally use $\alpha=4$ as a realistic, general approximation.

As in section 4.2 and with the help of eq. 4.5, we argue that the trust capital should asymptotically be proportional to $\xi^2$ and arrive at a formula that gives the trust capital as a function of $\xi$:

$$U_{ij} = U(\xi_{ij}^2) = 1 - \xi_{ij}^2 \quad (4.12)$$

which is analogous to eq. 4.6. This trust capital depending only on $\xi$ is called U to distinguish it from the final trust capital T that is based on more criteria. At $\xi=1$, eq. 4.12 yields a zero trust capital, neither increasing nor decreasing the credibility. Intuitively, a variable change of few standard deviations might correspond to this undecided situation; smaller variable changes lead to positive trust capital, larger ones to negative trust capital. In fact, the parameter $\xi_0$ of eq. 4.11 should be configured to a high value, leading to a rather tolerant behavior even if the volatility V is slightly underestimated.

The trust capital $U_{ij}$ from eq. 4.12 is a sufficient concept under the best circumstances: independent quotes separated by a small time interval. In the general case, a modified formula is needed to solve the following three special pair filtering problems.

1. Filtering should stay a local concept on the time axis. However, a quote has few close neighbors and many more distant neighbors. When the additive trust capital of a quote is determined by pairwise comparisons to other quotes as explained in section 3.b, the results from distant quotes must not dominate those from the close neighbors; the interaction range should be limited. This is achieved by defining the trust capital proportional to $(\Delta\Theta)^{-3}$ (assuming a constant $\xi$) for asymptotically large quote intervals $\Delta\Theta$.

2. For large $\Delta\Theta$, even moderately aberrant quotes would be too easily accepted by eq. 4.12. Therefore, the aforementioned decline of trust capital with growing $\Delta\Theta$ is particularly important in the case of positive trust capital. Negative trust capital, on the other hand, should stay strongly negative even if $\Delta\Theta$ is rather large. The new filter needs a selective decline of trust capital with increasing $\Delta\Theta$: fast for small $\xi$ (positive trust capital), slow for large $\xi$ (negative trust capital). This treatment is essential for data holes or gaps, where there are no (or few) close neighbor quotes.

3. Dependent quotes: if two quotes originate from the same source, their comparison can hardly increase the credibility (but it can reinforce negative trust in the case of a large $\xi$). In section 1.c, we introduce an independence variable $I_{ij}$, between 0 (totally dependent) and 1 (totally independent).

The two last points imply a certain asymmetry in the trust capital: gathering evidence in favor of accepting a quote is more delicate than evidence in favor of rejecting it.

All these concerns can be taken into account in an extended version of eq. 4.12. This is the final formula for the trust capital from a change filter:

$$T_{ij} = T(\xi_{ij}^2, \Delta\vartheta_{ij}, I_{ij}) = I_{ij}^* \frac{1 - \xi_{ij}^4}{1 + \xi_{ij}^2 + \left(\frac{d\Delta\vartheta_{ij}}{v}\right)^3} \quad (4.13)$$

where $$I_{ij}^* = \begin{cases} I_{ij} & \text{if } \xi_{ij}^2 < 1 \\ 1 & \text{if } \xi_{ij}^2 \geq 1 \end{cases} \quad (4.14)$$

The independence $I_{ij}$ is always between 0 and 1 and is computed by eq. 4.23. The variable d is a quote density explained in section 1.c. The configurable constant v determines a sort of filtering interaction range in units of the typical quote interval ($\approx 1/d$).

Table 3 shows the behavior of the trust capital according to eq. 4.13. The trust capital converges to zero with an increasing quote interval $\Delta\Theta$ much more rapidly for small variable changes $|\xi|$ than for large ones. For small $\Delta\Theta_{ij}$ and $I_{ij}=1$, eq. 4.13 converges to eq. 4.12.

TABLE 3

The trust capital T resulting from a comparison of two independent ($I^* = 1$) scalar quotes, depending on the relative variable change $\xi$ and the time interval $\Delta v$ between the quotes. $\xi$ is defined by eq. 4.11, and d and v are explained in the text.

| | $d\Delta v/v =$ | | | | |
|---|---|---|---|---|---|
| T | 0 | 0.5 | 1 | 2 | 4 |
| $|\xi| =$ | | | | | |
| 4 | −15.0 | −14.9 | −14.2 | −10.2 | −3.2 |
| 2 | −3.0 | −2.9 | −2.5 | −1.2 | −0.22 |
| 1 | 0 | 0 | 0 | 0 | 0 |
| 0.5 | 0.75 | 0.68 | 0.42 | 0.10 | 0.014 |
| 0 | 1 | 0.89 | 0.50 | 0.11 | 0.015 | ii. Computing the Expected Volatility

The expected volatility is a function of the size of the time interval between the quotes and thus requires a larger computation effort than other statistical variables. Only credible scalar quotes should be used in the computation. The updates of all statistics are therefore managed by another part of the algorithm that knows about final credibilities as explained in section 2.d.ii.

Choosing an appropriate time scale for measuring the time intervals between quotes is also important. A scale like $\Theta$-time (Dacorogna et al., 1993) is good because it leads to reasonable volatility estimates without seasonal disturbances. This is further discussed in section 1.d.

The expected volatility computation can be implemented with more or less sophistication. Here, a rather simple solution is taken. The first required statistical variable is the quote density:

$$d = EMA\left[\delta\vartheta_r; \frac{c_d}{\delta\vartheta}\right] \quad (4.15)$$

This is a moving average in the notation of (Zumbach and Müller); $\delta\Theta$ is the time interval between two "valid" (as defined on a higher level) neighbor quotes on the chosen time scale, which is $\Theta$-time, as in all these computations. $\Delta\Theta_r$ is the configurable range of the kernel of the moving average. The variable $c_d$ is the weight of the quote which has a value of $c_d=1$ or lower in case of repeated quote values. The iterative computation of moving averages is explained in (Zumbach and Müller). The value $1/\delta\Theta$ has to be assumed for the whole quote interval which implies using the "next point" interpolation as explained by the same documents. It can be shown that a zero value of $\delta\Theta$ does not lead to a singularity of the EMA (but must be handled correctly in a software program).

An annualized squared "micro"-volatility is defined as a variance, again in form of a moving average:

$$v = EMA\left[\Delta\vartheta_r; \frac{(\delta x)^2}{\delta\vartheta + \delta\vartheta_0}\right] \quad (4.16)$$

where the notation (also the $\delta$ operator) is again defined by (Zumbach and Müller) and the range $\Delta\Theta_r$ is the same as in eq. 4.15. $\delta x$ is the change of the filtered variable between (sufficiently credible) neighbor quotes. There is a small time interval offset $$\delta\vartheta_0 = \max\left(\frac{d_0}{d}, \delta\vartheta_{\min}\right) \quad (4.17)$$

The small positive term $\delta\Theta_0$ accounts for some known short-term behaviors of markets: (1) certain asynchronicities in the quote transmissions, (2) some temporary market level inconsistencies that need time to be arbitraged out, (3) a negative autocorrelation of many market prices over short time lags (Guillaume et al., 1997). However, $\delta\Theta_0$ is not needed to avoid singularities of v; even a zero value of both $\delta\Theta$ and $\delta\Theta_0$ would not lead to a singularity of the EMA. The "next point" interpolation is again appropriate in the EMA computation.

Strictly speaking, v can be called annualized only if $\Theta$ is measured in years, but the choice of this unit does not matter in our algorithm. The exponent of the annualization (here: assuming a Gaussian drift) is not too important because the different values of $\delta\Theta$ share the same order of magnitude.

Experience shows that the volatility measure of the filter should not only rely on one variance v as defined above. Preferably, we use three such volatilities: $v_{fast}$, v and $v_{slow}$. All of them are computed by eq. 4.16, but they differ in their ranges $\Delta\Theta_r$: $v_{fast}$ has a short range, v a medium-sized range and $v_{slow}$ a long range. The expected volatility is assumed to be the maximum of the three:

$$v_{exp} = \max(v_{fast}, v, v_{slow}) \quad (4.18)$$

This is superior to taking only v. In case of a market shock, the rapid growth of $v_{fast}$ allows for a quick adaptation of the filter, whereas the inertia of $v_{slow}$ prevents the filter from forgetting volatile events too rapidly in a quiet market phase.

From the annualized $v_{exp}$, we obtain the expected squared change as a function of the time interval $\Delta\Theta$ between two quotes. At this point, the filter has a special element to prevent the filter from easily accepting price changes over large data gaps, time periods with no quotes. Data gaps are characterized by a large value of $\Delta\Theta$ but very few quotes within this interval. In case of data gaps, an upper limit of $\Delta\Theta$ is enforced:

$$\Delta\vartheta_{corr} = \min\left[\frac{2.5Q}{d}, \max\left(\frac{0.1Q}{d}, \Delta\vartheta\right)\right] \quad (4.19)$$

where d is taken from eq. 4.15 and Q is the number of valid quotes in the interval between the two quotes; this is explained in section 2.b. Eq. 4.19 also sets a lower limit of $\Delta\Theta_{corr}$ in case of a very high frequency of valid quotes; this is important to validate fast trends with many quotes.

The corrected quote interval $\Delta\Theta_{corr}$ is now used to compute the expected squared change V:

$$V = V(\Delta\Theta_{corr}) = (\Delta\Theta_{corr} + \Delta\Theta_0)v_{exp} + V_0 \quad (4.20)$$

This function $V(\Delta\Theta_{corr})$ is needed in the trust capital calculation of section 1.c.i and inserted in eq. 4.11. The positive offset $V_0$ is small and could be omitted in many cases with no loss of filter quality. However, a small $V_0 > 0$ is useful. Some quotes are quoted in coarse granularity, i.e. the minimum step between two possible quote values is rather large as compared to the volatility.

This is the case in some interest rate futures and also for bid-ask spreads (in FX markets) which often have a rounded size of 5, 10, or 20 basis points with rarely a value in between. Quotes with coarse granularity have a hidden volatility: a series of identical quotes may hide a movement of a size smaller than the typical granule. The term $V_0$ thus represents the hidden volatility:

$$V_0 = 0.25g^2 + \epsilon_0^2 \quad (4.21)$$

where the granule size g is determined by eq. 8.15. The whole granularity analysis is explained in section 5.b where it plays a more central role. There is yet another term $\epsilon_0^2$ which is extremely small in normal cases. This $\epsilon_0^2$ is not related to economics; it has the purely numerical task to keep $V_0 > 0$.

The term $\epsilon_0^2$ however plays a special role if the scalar variable to be filtered is a (mathematically transformed) bid-ask spread. The spread filter is the least important filter, but leads to the highest number of rejections of FX quotes if it is configured similar to the filter of other scalars. This fact is not accepted by typical filter users: they want a more tolerant spread filter. A closer look shows that different contributors of bid-ask quotes often have different spread quoting policies. They are often interested only in the bid or ask side of the quote and tend to push the other side off the real market by choosing too large a spread. This results in the so-called bid-ask bouncing and in spreads of different sizes between neighbor quotes even in quiet markets. In some minor FX markets, some contributors even mix retail quotes with very large spreads into the stream of interbank quotes. In order not to reject too many quotes for spread reasons, we have to raise the tolerance for fast spread changes and reject only extreme jumps in spreads. This means raising $\epsilon_0^2$. The filter has $\epsilon_0 = \text{constant}_1(\bar{x} + \text{constant}_2)$, where $\bar{x}$ is defined by eq. 4.4. This choice of $\epsilon_0$ can be understood and appreciated if the mapping of the bid-ask spread, eq. 6.2, is taken into account.

In a filter run starting from scratch, we set $V_0 = \epsilon_0^2$ and replace this by eq. 4.21 as soon as the granule estimate g is available, based on real statistics from valid quotes (as explained in section 5.b).

iii. Comparing Quote Origins

Pair filtering results can add some credibility to the two quotes only if these are independent. Two identical quotes from the same contributor do not add a lot of confidence to the quoted level—the fact that an automated quoting system sends the same quote twice does not make this quote more reliable. Two non-identical quotes from the same contributor may imply that the second quote has been produced to correct a bad first one; another interpretation might be that an automated quoting system has a random generator to send a sequence of slightly varying quotes to mark presence on the information system. (This is why a third quote from one contributor in a rapid sequence should be given much less confidence than a second one, but this subtle rule has not yet been implemented). Different quotes from entirely different contributors are the most reliable case for pair filtering.

The basic tool is a function to compare the origins of the two quotes, considering the main source (the information provider), the contributor ID (bank name) and the location information. This implies that available information on contributors has a value in filtering and should be collected rather than ignored. An "unknown" origin is treated just like another origin name. The resulting independence measure $I'_{ij}$ is confined between 0 for identical origins and 1 for clearly different origins. In some cases (e.g. same bank but different subsidiary), a broken value between 0 and 1 can be chosen.

$I'_{ij}$ is not yet the final result; it has to be put into relation with the general origin diversity of the time series. An analysis of data from only one or very few origins must be different from that of data with a rich variety of origins. The general diversity D can be defined as a moving average of the $I'_{i\ i-1}$ of valid neighbor quotes:

$$D = EMA[\text{tick-time}, r; I'_{i\ i-1}] \quad (4.22)$$

where the range r (center of gravity of the kernel) is configured to about 9.5. The "tick-time" is a time scale that is incremented by 1 at each new quote used; the notation of (Zumbach and Müller) is applied. The "next point" interpolation is again appropriate in the EMA computation. Only "valid" quotes are used; this is possible on a higher level of the algorithm, see section 3.d.ii. By doing so, we prevent D from being lowered by bad mass quotes from a single computerized source overnight or weekend. Thus we are protected against a tough filtering problem: the high number of bad mass quotes from a single contributor will not force the filter to accept the bad level.

The use of D makes the independence variable $I_{ij}$, adaptive through the following formula:

$$I_{ij} = I'_{ij} + f(D)(1 - I'_{ij}) \quad (4.23)$$

with $$f(D) = \frac{0.0005 + (1-D)^8}{2.001} \quad (4.24)$$

If the diversity is very low (e.g., in a single-contributor source), this formula (reluctantly) raises the independence estimate $I_{ij}$, in order to allow for some positive trust capital to build up. For a strictly uniform source (I'=D=0), $I_{ij}$ will reach 0.5, that is one half of the $I_{ij}$ value of truly independent quotes in a multicontributor series.

The output variable $I_{ij}$ resulting from eq. 4.14 is always confined between 0 and 1 and is generally used in eq. 4.14. Some special cases need a special discussion:

Repeated quotes. Rarely, the raw data contains long series of repeated quotes from the same contributor, and the obtained value of $I_{ij}$, may still be too high. Solution: in the present filter, this case is handled by a special filtering element described in section 3.b.

High-quality data. In Olsen & Associates' database, we have completed and merged our collected data with some old, historical, commercially available daily data that was of distinctly higher quality than the data from a single, average-quality contributor. When comparing two quotes from this historical daily data, we forced $I_{ij}=1$ although these quotes came from the same "contributor." This special filtering element is necessary only if there are huge, proven quality differences between contributors; otherwise we can omit this.

Only in multivariate filtering (which is not included in the present filter, see section 5.d): Artificial quotes that might be injected by a multivariate covariance analysis should have $I'_{ij}=1$ when compared to each other or to any other quote.

d. A Time Scale for Filtering

Time plays a role in the adaptive elements of the level filter as well as in almost all parts of the change filter. Variable changes are tolerated more easily when separated by a large time interval between the time stamps. When using the term "time interval," we need to specify the time scale to be used.

The algorithm works with any time scale, but some are more suitable than others. If we tolerate quote level changes of the same size over weekend hours than over working hours, we have to accept almost any bad quote from the few weekend contributors. These weekend quotes are sometimes test quotes or other outliers in the absence of a liquid market. The same danger arises during holidays (but holidays may be confined to individual countries).

The choice of the time scale is important. Accounting for the low weekend activity is vital, but the exact treatment of typical volatility patterns during working days is less important. Therefore, we cannot accept using only physical time (=calendar/clock time), but the following solutions are possible:

1. A very simple business time with two states: active (working days) and inactive (weekend from Friday 21:00:00 GMT to Sunday 21:00:00 GMT, plus the most important and general holidays); the speed of this business time as compared to physical time would be either 1.4 (in active state) or 0.01 (in inactive state);

2. An adaptively weighted mean of three simple, generic business time scales $\Theta$: smoothly varying weights according to built-in statistics. This is the solution recommended for a new filter development independent of complex $\Theta$ technology.

3. An adaptively weighted mean of three generic business time scales $\Theta$ as defined by (Dacorogna et al., 1993); This is the solution of the filter running at Olsen & Associates, which requires a rather complicated implementation of $\Theta$-time.

The second solution differs from the third one only in the definition of the basic $\Theta$-time scales. Their use and the adaptivity mechanism are the same for both solutions.

Three generic $\Theta$-times are used, based on typical volatility patterns of three main markets: Asia, Europe and America, In the second solution, these theta times are simply defined as follows:

$$\frac{d\Theta_k}{dt} = \begin{cases} 3.4 & \text{if } t_{start,k} \leq t_d < t_{end,k} \text{ on a working day} \\ 0.01 & \text{otherwise (inactive times, weekends, holidays)} \end{cases} \quad (4.25)$$

where $t_d$ is the daytime in Greenwich Mean Time (GMT) and the generic start and end times of the working-daily activity periods are given by Table 4; they correspond to typical observations in several markets. The active periods of exchange-traded instruments are subsets of the active periods of Table 4. The time scales $\Theta_k$ are time integrals of $d\Theta_k/dt$ from eq. 4.25. Thus the time $\Theta_k$ flows either rapidly in active market times or very slowly in inactive times; its long-term average speed is similar to physical time. The implementation of eq. 4.25 requires some knowledge on holidays. The database of holidays to be applied may be rudimentary (e.g., just Christmas) or more elaborate to cover all main holidays of the financial centers on the three continents. The effect of daylight saving time is neglected here as the market activity model is anyway coarse.

TABLE 4

| market | k | $t_{start,k}$ | $t_{end,k}$ |
|---|---|---|---|
| (East) Asia | 1 | 21:00 | 7:00 |
| Europe | 2 | 6:00 | 16:00 |
| America | 3 | 11:00 | 21:00 |

Daytimes limiting the active periods of three generic, continent-wide markets; in Greenwich Mean Time (GMT). The scheme is coarse, modeling just the main structure of worldwide financial markets. The active periods differ according to local time zones and business hours; the Asian market already starts on the day before (from the viewpoint of the GMT time zone).

In Olsen & Associates' filter, the three $\Theta_k$-times are defined according to (Dacorogna et al., 1993); effects like daylight saving time and local holidays (i.e., characteristic for one continent) are covered. The activity in the morning of the geographical markets is higher than that in the afternoon—a typical behavior of FX rates and, even more so, interest rates, interest rate futures and other exchange-traded markets. In both solutions, the sharply defined opening hours of exchange-traded markets cannot fully be modeled, but the approximation turns out to be satisfactory in filter tests. An improved version of $\Theta$-time is being tested where sudden changes of market activity over daytime can be modeled.

Once the three scales $\Theta_k$ are defined (by the integrals of eq. 4.25 in our suggestion), their adaptively weighted mean is constructed and used as the time scale $\Theta$ for filtering. This $\Theta$-time is able to approximately capture the daily and weekly seasonality and the holiday lows of volatility. Absolute precision is not required as $\Theta$ is only one among many ingredients of the filtering algorithm, many of which are based on rather coarse approximations. This is the definition of $\Theta$-time:

$$\vartheta = \sum_{all\ k} w_k \vartheta_k \qquad (4.26)$$

with $$\sum_{all\ k} w_k = 1 \qquad (4.27)$$

where "all k" means "all markets." This is 3 in our case, but the algorithm also works for any other number of generic markets. The weights $w_k$ are adaptive to the actual behavior of the volatility. A high $w_k$ reflects a high fitness of $\Theta_k$, which implies that the volatility measured in $\Theta_k$ has low seasonal variations.

The determination of the $w_k$ might be done with complicated methods such as maximum likelihood fitting of a volatility model. However, this would be inappropriate, given the convergence problems of fitting and the anyway existing modeling limitations of eq. 4.26. The heuristic method of the Olsen & Associates' filter always returns an unambiguous solution. The volatility of changes of the filtered variable is measured on all $\Theta_k$-scales in terms of a variance similar to eq. 4.16:

$$\sigma_k = \sqrt{EMA\left[\Delta\vartheta_{smooth}; \frac{(\delta x)^2}{\delta\vartheta_k + \delta\vartheta_0}\right]} \qquad (4.28)$$

where $\delta\Theta_k$ is the interval between validated neighbor quotes in $\Theta_k$-time, $\delta x$ is the corresponding change of the filtered variable, $\delta\Theta_0$ is defined by eq. 4.17 and the time scale of the EMA is $\Theta_k$-time. The notation of (Zumbach and Müller) is again used. Smoothing with a short range $\Delta\Theta_{smooth}$ is necessary to diminish the influence of quote-to-quote noise. The EMA computation assumes a constant value of $(\delta x)^2/(\delta\Theta_k+\delta\Theta_0)$ for the whole quote interval, this means the "next point" interpolation (Zumbach and Müller).

The fluctuations of the variable $\sigma_k$ indicate the badness of the $\Theta_k$ model. In the case of a bad fit, $\sigma_k$ is often very low (when the $\Theta_k$-scale expands time) and sometimes very high (when the $\Theta_k$-scale compresses time). The fluctuations are quantified in terms of the variance $F_k$:

$$F_k = EMA[\Delta\vartheta_r: (\sigma_k - EMA[\Delta\vartheta_r; \sigma_k])^2] = \qquad (4.29)$$
$$= MVar[\Delta\vartheta_r, 2; \sigma_k]$$

in the notation of (Zumbach and Müller), where the time scale is again $\Theta_k$-time. The range $\Delta\Theta_r$ has to be suitably chosen. In our heuristic approximation, the fluctuations directly define the weight of the k'th market:

$$w_k = \frac{1}{F_k \sum_{all\ k'} \frac{1}{F'_k}} \qquad (4.30)$$

which satisfies eq. 4.27 and can be inserted in eq. 4.26.

2. The Scalar Filtering Window

Figure 5:
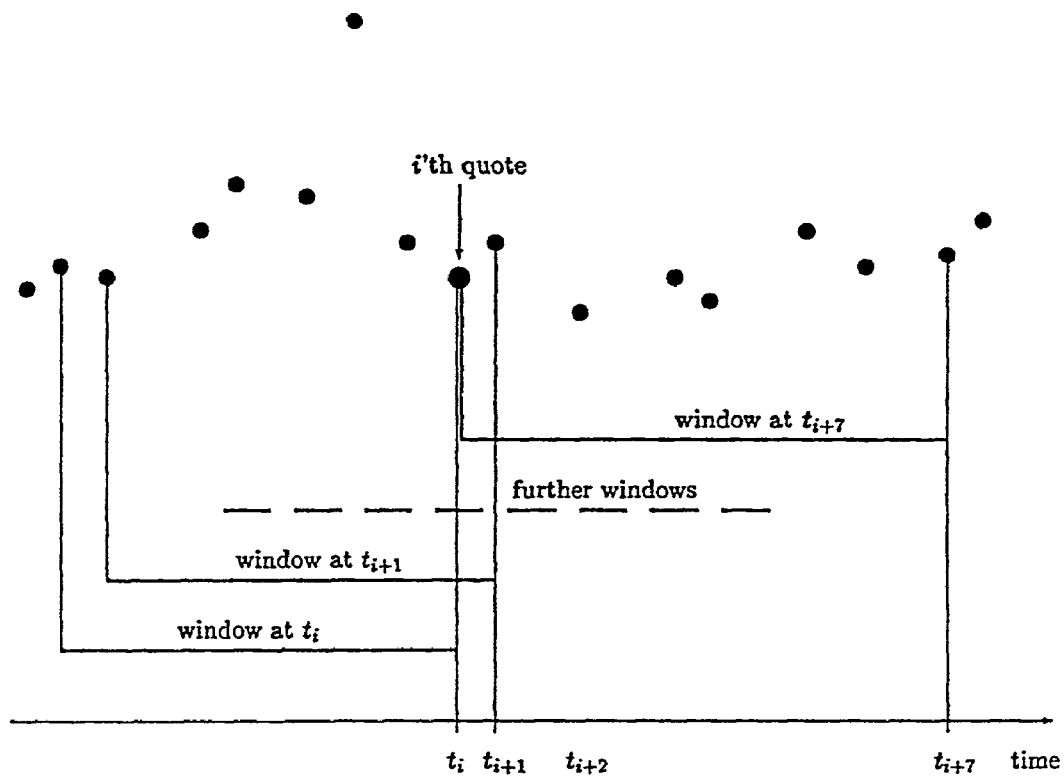
FIG. 5 is an illustration of a scalar filtering window used in the practice of the invention.

The filter is using a whole neighborhood of quotes for judging the credibilities of scalar quotes: the scalar filtering window. This window covers the set of all quotes of a time series that are contained in a time interval, In the course of the analysis, new quotes are integrated and old quotes are dismissed at the back end of the window following a certain rule. Thus the window is moving forward in time. This mechanism is illustrated by FIG. 5.

All the scalar quotes within the window have a provisional credibility value which is modified with new incoming quotes. When the quotes leave the window, their credibilities are regarded as finally determined. Sufficiently credible quotes are then used to update the statistics needed for adaptivity.

At the initialization of a filter from scratch, the window is empty. When the first scalar quote enters, it cannot be filtered by pair filtering yet, only the level filter applies.

a. Entering a New quote in the Scalar Filtering Window

Whenever a new scalar quote enters the window, an analysis is made based on earlier results and the new quote.

There are two possible ways in which a new quote enters the scalar filtering window:

1. The normal update: A new scalar quote from the data source enters, is analyzed and finally becomes the newest member of the scalar filtering window. The window variables are updated accordingly. These operations are described by sections 2.b and 2.c.

2. A filter test: A new scalar quote from any source is merely tested. It is analyzed as in a normal update, but it does not become a member of the window. No window variable is changed by this test. Thus we execute the steps of section 2.b and avoid those of section 2.c. The resulting trust capital of the new scalar quote is returned.

b. Analyzing a New Quote in the Scalar Filtering Window i. Computing the Trust Capital of a New Quote The algorithm of the filtering window is organized in an iterative way. Whenever a new quote enters the window, an update is made based on earlier results and an analysis of the new quote.

When the new, ith scalar quote arrives, it already satisfies certain basic validity criteria (e.g., a price is not negative) and has possibly been transformed to a logarithmic value. This is ensured by the higher-level quote splitting algorithm explained in section 6. The following filtering operations are done with the incoming ith scalar quote:

1. The base trust capital $T_{i0}$ is computed as the result of the level filter, eq. 4.6, if the scalar quote is a bid-ask spread. Otherwise, $T_{i0}=0$. The resulting $T_{i0}$ of eq. 4.6 is multiplied here by a configured constant $c_{level}$ that determines the importance of level filtering.
2. The new quote is compared to all old quotes of the window through pair filtering steps as described in section 1.c. The trust capitals $T_{ij}$ resulting from eq. 4.13 determine the trust capital $T_i$ of the new quote and also affect the trust capitals $T_j$ of the old quotes.

For computing $T_{ij}$, we need the expected squared value change V from eq. 4.20 and $\Delta\Theta_{corr}$ from eq. 4.19 and therefore the number Q of valid quotes in the time interval from quote j to quote i. For this, we use the valid-quote age $Q_j$ of the old quotes:

$$Q = Q_j + 1; \quad (5.1)$$

The increment by 1 stands for the new quote which is not yet integrated in the window. The computation of $Q_j$ is explained at the end of section 2.c. The resulting value of Q is inserted in eq. 4.19.

The trust capital of the new, ith quote is computed in an additive way as follows:

$$T'_i = c_{level} T_{i0} + \sum_{j=i-n}^{i-1} C_j T_{ij} \quad (5.2)$$

T' is not termed T because it is not yet the final resulting trust capital in some cases. Eq. 5.2 is a weighted sum with weights $C_j = C(T_j)$ from eq. 4.1 which are the current credibilities of the n other quotes of the window.

The number n of quotes used for comparison to the ith quote has an influence on the trust capital and thus the credibility. The higher the value of n, the higher the trust capital according to eq. 5.2 (provided that we are in a series of good data). This effect reflects reality: the more comparisons to other quotes, the more certain our judgment on credibility. However, the trust capital cannot be extended infinitely by increasing n, as to be explained. If some more distant quotes are used, the trust capital gains $T_{ij}$ are rapidly decreasing in absolute value, thanks to a term proportional to $(\Delta\Theta_{ij})^3$ in the denominator of eq. 4.13. The choice of n is further discussed in section 2.d.

Eq. 5.2 is a conservative concept insofar as it judges the credibility of a new quote in light of the previously obtained credibilities $C_j$ of the earlier quotes. In the case of an unusually large real move or price jump, new quotes on a new level might be rejected for too long a time.

ii. The Trust Capital in an "After-jump" Situation

The filter has a special mechanism to deal with "after-jump" situations. This may lead to a re-evaluation of the situation, a correction of the resulting trust capital $T_i$ and a quicker acceptance of a new level after a jump.

The first step of the after-jump algorithm is to identify the location of a possible real jump within the scalar filtering window. This is done during the computation of eq. 5.2. At every j, we test whether the incomplete sum of that equation, $$T'_{i,at j} = T_{i0} + \sum_{j'=i-n}^{j-1} C_{j'} T_{ij'} \quad (5.3)$$

is less than the critical value $T_{crit}$:

$$T_{crit} = \mu c_{level} T_{i0} - 1 \quad (5.4)$$

(where μ is defined below). At the same time, we test $T_{ij} > 0$ (this indicates having reached a new, stable level after the jump rather than an outlier). At the first j where both conditions are satisfied, we conclude that a value jump must have taken place somewhere before quote j−1. Although this jump certainly happened before quote j, we define $j_{jump} = j$ because this is the index of the first quote where we have a reason to believe that the jump was real. In order to validate this possibly real value jump, we initialize an alternative trust capital $T''_i$:

$$T''_{i,at j_{jump}} = T_{crit} - 0.5 + \mu(T'_{i,at j} - T_{crit}) \quad (5.5)$$

We dilute the normal trust capital $T'_{i,at j}$ by a small dilution factor μ. When initializing the filter from scratch (before having seen some 10 acceptable quotes), we choose a slightly larger μ value in order to prevent the filter from being trapped by an initial outlier. The offset term −0.5 in eq. 5.5 prevents the alternative hypothesis from being too easily accepted. For all values of $j \geq j_{jump}$, we set $$T''_j = \mu T_j \quad (5.6)$$

and insert these diluted trust capitals $T''_j$ of old quotes in eq. 4.1; the resulting credibilities $C''_j$ are used to complete the computation of the alternative trust capital $T''_i$:

$$T''_i = T''_{i,at j_{jump}} + \sum_{j=j_{jump}}^{i-1} C''_j T_{ij} \quad (5.7)$$

analogously to eq. 5.2. Thanks to the dilution effect, $T''_i$ is less determined by old credibilities than $T'_i$.

Now, we decide whether to take the normal, conservative trust capital $T'_i$ or the alternative $T''_i$. The resulting, final trust capital is $$T_i = \begin{cases} T''_i & \text{if } T''_i > T'_i \text{ and } T''_i > 0 \\ T'_i & \text{otherwise} \end{cases} \quad (5.8)$$

The alternative solution wins if its trust capital exceeds 0 and the trust capital of the conservative solution.

The trust capital $T_i$ of the new quote is the end result of a pure filter test. In the case of a normal update, the window has to be updated now.

c. Updating the Scalar Filtering Window with a New Quote

A new quote affects the trust capitals of the old quotes of the window. The most dramatic change happens in the case of accepting the alternative hypothesis according to eq. 5.8. In this case, a real value jump is acknowledged; this leads to a major re-assessment of the old quotes. First, the pairwise trust capital of quote comparisons across the jump is diluted:

$$T_{corr,ij} = \begin{cases} \mu T_{ij} & \text{for } j < j_{jump} \\ T_{ij} & \text{otherwise} \end{cases} \quad (5.9)$$

In the normal case with no jump, $T_{corr,ij}=T_{ij}$. Then, the quotes after the newly detected jump get a new chance:

$$T_{j,new} = \begin{cases} \mu T_j & \text{if } j < j_{jump} \text{ and } T_j < 0 \\ T_j & \text{otherwise} \end{cases} \quad (5.10)$$

In the case of a jump, this new value $T_{j,new}$ replaces $T_j$.

In every case, whether there is a jump or not, the trust capitals of all quotes are finally updated in additive way, in the spirit of eq. 5.2:

$$T_{j,new}=T_j+C_i T_{corr,ij}, \text{ for } j=i- \quad (5.11)$$

where $C_i=C(T_i)$ follows from eq. 4.1, inserting the newly obtained $T_i$ (from eq. 5.8). The result $T_{j,new}$ of eq. 5.11 is replacing the old value $T_j$. It should also be clarified that the diluted values $T''_j$ from eq. 5.6 are never directly used to modify the trust capitals $T_j$.

In historical filtering, eqs. 5.9-5.11 may lead to the rehabilitation of an initially rejected old quote. Even in real-time filtering, the corrected trust capital of an old quote indirectly contributes to the filtering of new quotes through eq. 5.2 and through the use of only sufficiently credible old quotes in the statistics of adaptive filtering.

The valid-quote age $Q_j$ of all the old quotes is also updated:

$$Q_{j,new}=Q_j+C_i, \text{ for } j=i-n \ldots i-1 \quad (5.12)$$

where $C_i=C(T_i)$. The more credible the new quote, the higher the increment of the valid-quote age $Q_j$.

After all these updates, the new quote with index i and with its newly computed trust capital $T_i$ is inserted in the window as its newest member, with the valid-quote age $Q_i$ initialized to zero.

d. Dismissing Quotes from the Window and Updating the Statistics i. The Quote Dismissal Rules The window does not grow infinitely. There is a rule for dismissing scalar quotes at the end of every normal update as described in section 2.c. There are three criteria for a proper size of the window: (1) a sufficient time interval, (2) a sufficient number of quotes, (3) a sufficient overall credibility of all scalar quotes. These criteria are listed here in the sequence of increasing importance.

In our general quote dismissal rule, we use the product of the criteria. At the end of an update with a new quote, the following condition for dismissing the oldest quote (with index i−n) is evaluated:

$$(\vartheta_i - \vartheta_{i-n+1})n^2 \left( \sum_{j=0}^{n-1} C_{i-j} \right)^6 \geq W \quad (5.13)$$

The sum of credibility, the overall credibility, is the most important criterion and is therefore raised to the 6th power. The configuration parameter W defines the sufficient size of the window and has the dimension of a time. The parameter W is somehow related to the parameter ν of eq. 4.13 which determines a sort of a filtering range. Choosing a very large W when ν is limited does not add a lot of value because the distant quotes have a negligible weight in this case.

A few considerations may illustrate the behavior of eq. 5.13. If the data in the window is of good quality, the window is of small size. As soon as a cluster of low-quality or doubtful data enters the window, it will grow (sometimes to a very large size) until the situation becomes clearer and most old quotes can be dismissed again, In the case of a sparse time series, the window may contain few quotes but these quotes will extend further in time than for a dense time series.

After dismissing the oldest quote when eq. 5.13 is fulfilled, the whole quote dismissal procedure is repeated as long as the remaining window still satisfies eq. 5.13.

In very rare cases, the window grows to a very large size and the filtering algorithm becomes slow. This problem and our solution are discussed in section 2.d.iii. Aside from this, another safety measure is taken by the filter: an oldest quote older than 300 days is dismissed from the window even if eq. 5.13 is not fulfilled, as long as the remaining window still has at least two quotes.

Dismissed scalar quotes are also reported to the higher level of the filtering algorithm. This is necessary in the case of historical filtering for producing the final filtering results.

ii. Updating the Statistics

When a scalar quote is dismissed from the window, its credibility $C_i$ has reached a final value that will no longer be changed: $C_i=C(T_i)$ as resulting from eq. 4.1. This is the right moment to update all the statistics needed for the adaptivity of the filter.

Invalid quotes are excluded from these statistics, they are simply ignored when updating the statistical variables. We set a critical credibility level $C_{crit}$; only quotes with credibility values above $C_{crit}$ are used for updating the statistics. However, we should not be too rigid when excluding quotes. The filter has to adapt to unexpected events such as sudden volatility increases, but this requires including also some mildly rejected quotes. In fact, tests have shown that only the totally invalid quotes should be excluded here. We choose a low critical credibility level. Only in the initial phase right after a filter starts from scratch (before having seen some 10 acceptable quotes), we take a larger, more cautious value.

If a dismissed quote has a credibility $C_i>C_{crit}$, we update all the statistics. These updates typically imply the computation of moving average iteration formulas; the statistics are explained in sections 1.b., 1.c., and 1.d.

iii. A Second Scalar Filtering Window for Old Valid Quotes

The quote dismissal rule of eq. 5.13 makes sure that the scalar window stays reasonably small—except in case of a very long series of bad quotes. Such long series rarely occur, usually generated by computerized quoting, e.g., repeated or monotonic quotes. The filtering window technology as described so far is well able to handle this case, but the computation time of the filter grows very much in case of a very large window. In real time, this does not really matter, but historical filtering becomes slow.

For efficiency reasons, the filter therefore supports a second queue of old valid quotes The normal scalar window size is strictly limited to a maximum number of quotes, but an old quote dismissed from the normal window is stored in a second scalar window if its credibility exceeds a low threshold value. Otherwise, the dismissed quote is treated as any dismissed quote, as explained before, including the updating of statistics and the final reporting of its credibility.

This second scalar window of old valid quotes is normally empty. As soon as one or more dismissed quotes are in this window, it is treated as a prepended part of the normal scalar window in all computations. The trust capital computation of eq. 5.2, for example, has a sum over both scalar windows, starting at the window of old valid quotes. The window of old valid quotes stays and possibly grows as long as the quote dismissal condition of eq. 5.13 for both scalar windows together is not fulfilled. When it is fulfilled, the oldest quote of the scalar window of old valid quotes is deleted; after deleting all of its quotes, the second window is again empty and filtering is back to the normal mode.

The proposed scalar window of old valid quotes is also presented as an element of the UML diagram of FIG. 4. Note that a scalar quote of the "oldValidQuotes" window owns the pointer to a full tick (because the "FullQuoteWindow" no longer supports this full tick at this time), whereas the scalar quotes of the normal scalar window merely have a pointer to the corresponding full tick with no ownership.

The concept of a second scalar filtering window for old valid quotes adds quite some complexity to the filter but it is motivated only by efficiency reasons.

3. The Full-quote Filtering Window

The full-quote filtering window is managed on hierarchy level 2 of Table 1. It is basically a sequence of recent full quotes plus a set of algorithmic methods of managing and processing this sequence. Its position in the algorithm is also shown in FIG. 4 (class FullQuoteWindow).

The full-quote filtering window has the following tasks:
Splitting the quotes into scalar quotes that can be used in the filtering operations of section 1.
A first basic validity test for the filtered variables. This is usually a domain test, e.g. rejecting negative prices. Rejected scalar quotes are marked as invalid ($C_i$=0) and eliminated from all further tests. They do not enter a scalar filtering window.
In many cases, a mathematical transformation of the quoted level. Example: taking logarithms of prices instead of raw price values.
Creating independent filtering environments for all types of scalar quotes, each with its own scalar filtering window.
Storing the credibility of dismissed scalar quotes until all the other scalar quotes belonging to the same full quote have also been dismissed. (The spread filter may dismiss quotes before the bid price filter, for example).
Storing the full quotes as long as two or more filtering hypotheses coexist, until one of them wins. This is decided by the next higher hierarchy level, see section 4; in the filter, the decision between filtering hypotheses is made fast enough to make this point superfluous.
When a full quote is finally dismissed, reporting it, together with its filtering results, to the higher level (needed only in historical filtering).

In principle, the full-quote filtering window also offers the opportunity of analyzing those data errors that affect full quotes in a way that cannot be analyzed when just looking at scalar quotes after splitting. However, in testing the filter, we have never found a good reason to implement this (aside from the filtering hypotheses discussed in section 4 and therefore do not discuss it further.

The full quotes may enter a full-quote filtering window in a form already corrected by a filtering hypothesis. This fact plays no role here: the algorithm of the full-quote window does not care about quote corrections. This is managed on a higher level.

The most important task of the full-quote filtering window is quote splitting.

a. Quote Splitting Depending on the Instrument type

Quotes can have complex structures as explained above. Our filter follows the guidelines of quote splitting which is motivated by the goals of modularity and transparency. Instead of trying to formulate complex algorithms for complex data structures, we split the quotes into scalar quotes that are individually filtered, whenever possible. Some filtering operations, however, are done on a higher level before splitting, as explained in section 4.

The quote splitting unit has the task of splitting the stream of full quotes into streams of different filtered variables, each with its scalar quotes that are used in the filtering operations of section 1.

Some quotes, such as bid-ask or open/high/low/close quotes, are splittable by nature. In the Olsen & Associates' data collection, only the bid-ask case matters. Many instruments come in the form of bid-ask quotes. Other instruments have single-valued quotes. Bid-ask quotes are split into three scalar quotes:

1. bid quote;
2. ask quote;
3. bid-ask spread.

Other instruments have single-valued quotes which are "split" into one scalar quote:

1. the "level" quote.

This is not as trivial as it looks because quote splitting is coupled with two other operations: basic validity testing and mathematical transformations, as explained below.

The user of the filter has to know whether an instrument has single-valued or bid-ask quotes and has to select or configure the filter accordingly.

b. The Basic Validity Test

Many quotes have a natural lower limit of the allowed domain. This instrument-dependent information has an impact on quote splitting and needs to be configured by the user. The lower limit of the allowed domain is called $p_{min}$. For some instruments, there is no limit (or $p_{min}=-\infty$). The choice of the lower limit is rather obvious for most instruments. Here is a list of important examples:

Prices: Genuine asset prices of whatever kind, including FX and equity prices, are never negative. This means: $p_{min}=0$.
FX forward premia/discounts: Unlike outright FX forward prices, the "forward points" (or FX swap rates) are not prices but rather values to be added to prices. Therefore, they can be negative or positive. There is no lower limit ($p_{min}=-\infty$).
Interest rates: These can be slightly negative in practice, e.g., in the case of JPY interest rates towards the end of 1998, depending on the credit rating of the quoting bank (but these interest rates were above −1%). There are some theories that rely on interest rates staying always positive, but a filter is not allowed to reject slightly negative interest rates if these are posted by reasonable contributors. We use a slightly negative value of $p_{min}$ here.
Short-term interest-rate futures: These are often handled as normal prices (where $p_{min}=0$), but are defined as 100%− 0.25f (by LIFFE, where f is the forward interest rate for the maturity period), so there is no lower limit (but an upper one). In practice, the futures quotes are so far from 0 that it does not matter whether we assume a lower limit of 0 or none.

The choice of the lower limit is important for the further treatment.

The following errors lead to complete invalidity:

Quotes that violate the monotonic sequence of time stamps, i.e. quotes with a time stamp before the previously treated quote. (In some software environments, this is an impossible error).

A domain error: an illegal level p of the filtered variable, i.e., $p<P_{min}$ (as opposed to a merely implausible level).

Invalid scalar quotes with an error of this kind do not enter a scalar filtering window and are completely ignored in all further filtering steps. We mark them by setting $C_i=0$. This is a fundamentally stronger statement than merely giving a very low credibility as a result of the scalar filtering window.

In the case of bid-ask quotes, the three resulting scalar quotes are tested individually:

1. bid quote: domain error if bid quote $p_{bid}<p_{min}$,
2. ask quote: domain error if ask quote $p_{ask}<p_{min}$.
3. bid-ask spread: domain error if $p_{ask}<p_{bid}$.

Thus it is possible that the same quote leads to a valid bid quote passed to the scalar filtering window of bid prices and an invalid ask quote that is rejected.

The domain test of bid-ask spreads needs to be further discussed. First, we might interpret bad values ($p_{ask}<p_{bid}$) as the result of the sequence error, i.e., the contributor typed ask/bid instead of bid/ask, an error that could be corrected by the filter. This interpretation, although being true in many cases, is dangerous as a general rule. We prefer to reject all ask quotes that are less than the bid quote.

On the other hand, a more rigid test might also reject zero spreads. In this case the domain error condition would be $p_{ask} \leq p_{bid}$. This is a good condition in many cases, well founded by theory. However, there are quote contributors to minor markets interested only in either bid or ask or middle quotes. These contributors often produce formal quotes with $p_{bid}=p_{ask}$. In some markets, such quotes are the rule rather than the exception. A filter that rejects all those quotes is throwing away some valuable and irreplaceable information.

We solve this problem as follows. First, there is a filtering option of generally rejecting zero spreads, i.e., the case $p_{bid}=p_{ask}$. If the user chooses this option, the quote splitting algorithm will act accordingly. Otherwise, zero spreads can be accepted, but they have low credibilities in a market dominated by positive spreads. This is further explained in the next section.

c. Transforming the Filtered Variable

The filtered variable is mathematically transformed in order to reach two goals:

1. A simpler (e.g., more symmetric) distribution function. The basic filtering operations, e.g., eq. 4.6, assume a roughly symmetric distribution function of the scalar quote values (and their changes). Some variables, mainly the bid-ask spread, have a skewed distribution function. The filtering method contains no full-fledged analysis to determine the exact nature of the distribution function; that would be too much for an efficient filter algorithm. The idea of the transformation is that the mathematically transformed variable has a more symmetric distribution function than the raw form. This has been demonstrated for the logarithm of bid-ask spreads.
2. Stationarity: making the behavior of the variable closer to stationary. A nominal price is less stationary than its logarithm; this is why most researchers in quantitative finance formulate their models for logarithmic prices. Stationarity is a strong requirement only for very volatile instruments. If the time series is less volatile, the filter can also cope with non-stationary raw data thanks to its adaptivity.

Our filter has simple rules for the mathematical transformation closely related to the validity tests of section 3.b. The mathematical transformation never fails because all illegal quotes have already been removed by the domain tests. The transformed quote value is denoted by x and used in many formulas of section 1.

For single-valued quotes, bid quotes and ask quotes, the following transformation is made:

$$x = \begin{cases} \log(p - p_{\min}) & \text{if } p_{\min} > -\infty \text{ exists} \\ p & \text{otherwise} \end{cases} \quad (6.1)$$

For bid-ask spreads, the transformation is $$x = x_{spread} = 45.564\sqrt{x_{ask} - x_{bid}} \quad (6.2)$$

where $x_{bid}$ and $x_{ask}$ are results from eq. 6.1. Eq. 6.2 has been chosen to return a value similar to log $(x_{ask}-x_{bid})$+constant for a wide range of arguments $x_{ask}-x_{bid}$ of typically occurring sizes. Indeed, a logarithmic transformation of spread values would be a natural choice. There is a reason to use eq. 6.2 rather than a logarithmic transformation: the treatment of zero spreads as already discussed at the end of section 6.2. A logarithmic transformation would make zero spreads impossible (as $\log(0)=-\infty$). When inserting a zero spread in eq. 6.2, we obtain the legal result x=0. This value is quite far away from typical ranges of values obtained for positive spreads, so its credibility is likely to be low in normal situations. When zero spreads become a usual event, the filter will accept them after a while.

4. Univariate Filtering

Univariate filtering is the top level of our filter. All the main filtering functions are managed here. This is also shown in FIG. 4 (class UnivarFilter).

The full-quote filtering window with its quote splitting algorithm of section 3.a is on a lower hierarchy level (see Table 1). Thus the univariate filter sees full quotes before they are split; it has access to all components of a full quote in their raw form (i.e. not mathematically transformed as in section 3.c). Its position on top of the filtering algorithm is also shown in FIG. 4 (class UnivarFilter).

The tasks of univariate filtering are:

Main configuration of a filter.

Analyzing those data errors that affect not only individual quotes but a whole continuous sequence of quotes. The presence (or absence) of such a general error defines the filtering hypothesis. Two such cases were found in financial data and are therefore covered by the our filter:

1. Decimal errors: a wrong decimal digit of the quote, corresponding to a constant offset from the true quote.
2. Scaling factor: the quote deviates from the true level by a constant factor, often a power of 10.

Both cases are further discussed below.

Creating a new full-quote filtering window for a newly detected filtering hypothesis.

Managing filtering hypotheses and their full-quote filtering windows during their lifetimes, selecting the winning hypothesis.

In the case of an error hypothesis: correcting the error of new incoming quotes according to the hypothesis and passing the corrected quotes to the full-quote filtering window.

Packaging the filtering results to be accessed by the user. The timing of the filtering output is different in historical and real-time filtering as to be explained.

Recommending a suitable build-up period of the filter prior to the desired start date of the filtering result production, based on the filter configuration. A discussion of this task can be found in section 6.1.

The errors affecting a continuous sequence of quotes cannot be sufficiently filtered by the means described in the previous sections; they pose a special challenge to filtering. The danger is that the continuous stream of false quotes is accepted to be valid after a while because this false series appears internally consistent.

A filtering hypothesis is characterized by one general assumption on an error affecting all its quotes. This can lead to another unusual property. Sometimes the cause of the error is so clear and the size of the error so obvious that quotes can be corrected. In these cases, the filter produces not only credibilities and filtering reasons but also corrected quotes that can be used in further applications. This is discussed further below.

The errors leading to a filter hypothesis are rare. Before discussing the details, we should evaluate the relevance of this filtering element in general. Such an evaluation may lead to the conclusion that the filtering hypothesis algorithm is not necessary in a new implementation of the filter.

Decimal errors were the dominant error type in the page-based data feed from Reuters in 1987-1989. In later years, they have become rare; they hardly exist in modern data feeds. The few remaining decimal errors in the 1990s often were of short duration so they could successfully be filtered also through the standard data filter. Thus there is no convincing case for adding a decimal error filter algorithm to a filter of modern data. Our filter nevertheless has a decimal error filter because it is also used for filtering old, historical data.

The scaling filter is also superfluous if the user of the filter has a good organization of raw data. If a currency is re-scaled (e.g. 1000 old units=1 new unit as in the case of the Russian Ruble), a company with good data handling rules will not need the filter to detect this; this re-scaling will be appropriately handled before the filter sees any scaling problem. At Olsen & Associates, re-scaled currencies (or equity quotes after a stock split) are treated as a new time series. However, the transition between the two definitions may not be abrupt, and there may be a mixture of quotes of both scaling types for a while. A scaling analysis within the filter can serve as an additional element of safety to treat this case and detect unexpected scale changes. This is the purpose of the scaling analysis in our filter.

There is the possibility of having coexisting hypotheses, for example the hypothesis of having a decimal error and the hypothesis of having none. This feature of the filter architecture is not used by the our filter. Rather, an immediate decision in favor of one hypothesis is always made, so there is no need to store two of them simultaneously.

a. Decimal Error Filter

The decimal error is the only well-known, relevant type of a general error affecting whole quote sequences. (Scale changes cannot be called errors as they are usually made for good reasons).

The decimal error as a persistent phenomenon is caused by data processing technologies using a cache memory. This means intermediary storage of data by the data providers or their software installed at customers' sites. The data customers sees a quote extracted from this cache memory rather than the original quote or its direct copy. The error happens when cache memories are updated by partial updates rather than full refreshments of cached quotes. The use of partial updates is motivated by minimization of message sizes. If one of these update messages gets lost and the following updates succeed, the result in the cache memory can be wrong, e.g., a decimal error. Unfortunately, this error may stay for a long time once parts of the cache are wrong.

Let us now look at a practical example: the decimal errors typical for page-based data feeds of Reuters in the late 1980s. Assume an original, correct quote, 1.5205/15, in the cache memory (format: bid price/ask price, last two digits). This price is updated by a partial update message, "198/08", placed at the end of the initial quote location, with the intention to store the new quote 1.5198/08. This update is lost now, the quote in the cache stays 1.5205/15. The next update message is "95/05", placed at the end of the initial quote, with the intention to store the new quote 1.5195/05. The resulting bad quote in the cache is 1.5295/05 because the "big" decimal digit "2" has survived in the cache. This is a decimal error: a shift by 0.01 which is a power of 10.

It seems that decimal errors are much less likely to occur in record-based data feeds than in page-based feeds. However, there may be hidden cache mechanisms also in the information processing of record-based data feeds; this should be investigated. If there is no cache or similar mechanism in the whole environment of data to be filtered, the decimal error filter can be omitted.

At the very beginning, our decimal error filter always assumes the default state of no decimal error. Every new, incoming quote can be distorted by a decimal error and is tested accordingly. The test for entering a decimal error focuses on some characteristic features of the error generation mechanism as described above. The following criteria are tested in sequence:

Size of the jump: the value change d between the previous quote and the new quote is computed. If |d| is close to a power of 10 (preferably slightly below), the decimal error hypothesis is supported. The test is $|d|/p > 0.6999$, where p ($>|d|$) is the next larger power of 10, also with negative exponent. In our example, the bid price change is from 1.5205 to 1.5295, so $d=0.0090$, $|d|/p=0.9$, and the decimal error hypothesis is supported.

Size of the time interval: support the decimal error hypothesis only if the interval from the previous quote to the new quote is less than 70 minutes. In practical experience, decimal errors do not happen over long time gaps.

Validity of the corrected quote: the corrected quote is computed, assuming there was a decimal error with shift of size p. This corrected value must pass the validity test of section 2.a.

Credibility advantage: the decimally corrected value should be much more credible than the raw value. If this is not the case, the decimal error is rejected.

Critical digit: in the lifetime of a decimal error generated by the mechanism described above, the bad decimal digit ("2" in our example) stays the same. This is also tested. However, this test may fail for incomplete ask quotes of a true decimal error, as in the typical quoting style used in page-based feeds, like 1.5295/05. This quote is expanded to 1.5295/1.5305. Therefore, the O & A filter requires the critical digit test to succeed just for the bid quote, not for ask.

A decimal error is accepted only if it is confirmed by all these tests. The credibility advantage test needs a further explanation. Decimal errors are rare, and we should not accept spurious decimal errors, so the credibility advantage in their favor must be overwhelming in order to confirm them. The following test is used:

$$T_{raw} < -0.1 \times [4 - \min(T_{corr}, 4)]^2 \qquad (7.1)$$

This means that acceptable uncorrected quotes with $T_{raw}>-0.1$ will never be rejected in favor of decimally corrected quotes. The two trust capitals $T_{raw}$ (of the raw, uncorrected quote) and $T_{corr}$ (of the corrected quote) result from eq. 5.8 after a mathematical transformation of the raw or corrected quote by eq. 6.1. Here we have a case where the trust capital of new quotes is computed just for testing, without updating any variable of the scalar or full-quote windows. This is explained at the beginning of section 2.a.

The case of bid-ask quotes is more complicated. The bid and ask quotes are tested independently, but the critical digit test is omitted for the ask quote, as explained above. If both have a decimal error, we test whether they have the same error, i.e. whether their value changes d have the same sign and the same power of 10, p. Then the error is a common decimal error. Other results are also possible: decimal error for bid quote, for ask quote alone or independent decimal errors for bid and ask. (In the last two cases, the critical digit test must succeed also for ask quotes). Tests have shown that the common decimal error is the only decimal error type of bid-ask quotes that really needs to be tested. All the other types are of short duration so they can be covered also by the normal filter (or they are spurious). Therefore, we recommend testing only for common decimal errors.

Once a decimal error is found, the decimal error hypothesis is accepted and the new quotes enter the full-quote filtering window in corrected form. This is also true for all successor quotes until the decimal error hypothesis is terminated. This is the place where the coexistence of two full-quote filtering windows could start: we might have one window with corrected quotes and another, parallel window with uncorrected quotes. This would be the best solution in doubtful cases: there, we could keep both hypotheses alive until some later quotes would give clear evidence in favor of one of them. Thanks to the low importance of decimal errors, the filter does not need to use this possible best solution. It always takes an immediate decision, either against the decimal error or, if all the conditions are fulfilled, for the decimal error. Thus it does not need to conduct parallel full-quote filtering windows.

The decimal error hypothesis, once accepted, can be terminated only if some termination conditions are fulfilled. For every new quote, the following tests are made in sequence:

Time-out: a decimal error hypothesis older than 2 full days is terminated

Back-jump: the value change d between the previous quote and the new quote is computed. If d has the opposite sign of the d at the start of the decimal error and $|d|/p>0.4999$, we probably see the back-jump from the bad level to the true level. This leads to a termination of the decimal error only if the next test is also passed.

Credibility advantage: this test is only executed if the previous test finds a probable back-jump. The decimally corrected value should be much less credible than the raw value. If this is the case, the decimal error is terminated.

Critical digit: if the critical digit changes, the decimal error is immediately terminated. In the case of bid-ask data with a common decimal error, this test is made for the bid quote only. The ask quote, if expanded from an incomplete quoting format such as 1.5295/05, may change the critical digit also while staying in a decimal error.

The credibility advantage test for the back-jump is less rigid than the test for jumping into a decimal error, eq. 7.1. The following test for terminating a decimal error is used:

$$T_{corr}<0.3-0.5[4-\min(T_{raw},4)]^2 \quad (7.2)$$

The two trust capitals $T_{raw}$ (of the raw, uncorrected quote) and $T_{corr}$ (of the corrected quote) again result from eq. 5.8 after a mathematical transformation of the raw or corrected quote by eq. 6.1. These computations are done just for testing and do not lead to any updates of the scalar or full-quote windows.

After the termination of a decimal error, the filter will continue its normal operations using the raw, uncorrected form of the quote. This is also true for the following quotes, but each one will again be tested by the entry conditions of a new decimal error.

b. Scaling Analysis in the Filter

Some quotes are scaled by a constant factor as compared to the level of the earlier quotes. There is often a good reason for this scale factor: changed quoting habits (e.g., quoting the value of 1 DEM in NOK, Norwegian Crowns, instead of the value of 100 DEM) or re-definitions of currencies (e.g. 1 new Russian Ruble 1000 old Rubles). If this data is sent to the filter with no intervention, the standard filter just sees a huge price jump which it has to reject.

Our filter analyzes and possibly corrects those scaling factors that are powers of 10. Other factors are also possible (see section 5.c.i) but not easily tractable.

The scaling analysis always starts from the previous scale factor $S_{prev}$. At initialization from scratch, this is of course $S_{prev}=1$. The new quote p is checked in comparison to the old quote $p_{prev}$. (At initialization from scratch, $p_{prev}$ is initialized to the first incoming quote value). Normally, $p/p_{prev}\geq\sqrt{0.1}$ and $p/p_{prev}<\sqrt{10}$ (Square roots of 10 are used in these tests as natural separators between factors of 10). In rare cases, one of these conditions is violated. If p and $p_{prev}$ have different signs, the whole analysis is stopped and the old factor $S_{prev}$ is kept. Otherwise the power of 10, $10^n$ is determined that satisfies $10^n p/p_{prev}\geq\sqrt{0.1}$ and $10^n p/p_{prev}<\sqrt{10}$. The newly proposed scaling factor is then $10^n S_{prev}$.

This new scaling factor must be confirmed by further tests to be accepted. In some cases, a quote level change of a factor 10 or more can be natural for a time series. Examples: an FX forward premium can easily and quickly shrink from 10 to 1 basis point; Japanese interest rates were so low that they could easily change from 0.06% to 0.6% between two quotes (especially if these two quotes came from banks with different credit ratings). In these cases, a new scale factor would be spurious; correcting by it would be wrong.

Thus we first test whether the new quote scaled by the previous factor $S_{prev}$ would be rejected by the filter:

$$T_{oldFactor} < \begin{cases} -17 & \text{if } 10^n=10 \text{ or } 10^n=0.1 \\ -5 & \text{otherwise} \end{cases} \quad (7.3)$$

where $T_{oldFactor}$ is obtained from eq. 5.8. As in the decimal error filter, T is computed just for testing without updating any variable of the scalar or full-quote windows. The condition of eq. 7.3 must be fulfilled in order to give the new scaling factor a chance. It is particularly strong if the scale change is by a factor 10 or 0.1, for two reasons. A scale change by a factor 10 or 0.1 is 1. extremely rare (there is no known case in the FX, IR and many other markets);
2. more likely than any other scale change to be a true move of the quote value, as in the example of the Japanese interest rates mentioned above.

If the new quote scaled by the previous scaling factor is rejected, we need yet another test: does the new quote scaled by the new factor $10^n S_{prev}$ have a superior credibility? We compute $T_{newFactor}$ in the same way as $T_{oldFactor}$ and test the following condition:

$$T_{newFactor} < \begin{cases} T_{oldFactor} + 20 & \text{if } 10^n = 10 \text{ or } 10^n = 0.1 \\ T_{oldFactor} + 8 & \text{otherwise} \end{cases} \quad (7.4)$$

Again, the condition is particularly strong if the scale change is by a factor 10 or 0.1. If it is fulfilled, the new scaling factor $10^n S_{prev}$ of the quoted value is accepted.

For bid-ask quotes, this scaling analysis is made for both the bid and ask quotes. A scale change is accepted only if both have the same new scale factor. Otherwise, the new scale factor is rejected and the old scaling factor $S_{prev}$ is kept.

The value of an accepted new scaling factor, $10^n S_{prev}$, is finally assigned to the variable $S_{prev}$.

c. The Results of Univariate Filtering

The output of the univariate filter consists of several parts. For every quote entered, the following filtering results are available:
1. The credibility of the quote.
2. The value(s) of the quote, possibly corrected according to a filtering hypothesis as explained in sections 4.a and 4.b.
3. The filtering reason, explaining why the filter has rejected a quote.
4. Individual credibilities of scalar quotes (bid, ask, spread)

Users may only want a minimum of results, perhaps just a yes/no decision on using or not using the quote. This can be obtained by simply checking whether the credibility of the quote is above or below a threshold value which is usually chosen to be 0.5.

In the case of bid-ask data, the credibility C of the full quote has to be determined from the credibilities of the scalar quotes. The filter uses the following formula:

$$C = \min(C_{bid}, C_{ask}, C_{spread}) \quad (7.5)$$

This formula is conservative and safe: valid quotes are meant to be valid in every respect.

The timing of the univariate filtering output depends on its timing mode: historical or real-time.

d. The Production of Filtering Results—In Historical and Real-time Mode

The terms "historical" and "real-time" are defined from the perspective of filtering here. The final application may have another perspective. A filter in real-time mode may be applied in a historical test, for example.

The two modes differ in their timing:
In the real-time mode, the credibilities of a newly integrated quote as resulting from eq. 5.8 (inserted in eq. 4.1) are immediately passed to the univariate filtering unit. If there is only one filtering hypothesis as in our filter, these credibilities are directly accessible to the user. Alternatively, If there are several hypotheses, the hypothesis with the highest overall credibility will be chosen (but the pure fact of the existence of several hypotheses leads to a reduced credibility of all of them).

In the case of historical filtering, the initially produced credibilities are modified by the advent of new quotes. Only those quotes are output whose credibilities are finally "cooked." At that time, the quotes leave the full-quote filtering window; this implies that their components have also left the corresponding scalar filtering windows. If several filtering hypotheses coexist, their full-quote windows do not dismiss any quotes, so we get filtering results only when conflicts between filtering hypotheses are finally resolved in favor of one winning hypothesis.

Although these modes are different, their implementation and selection is very easy. In the historical mode, we retrieve the oldest member of the full-quote window only after a test on whether this oldest quote and its results are ready. In the real-time mode, we pick the newest member of the same full-quote window. Thus it is possible to get both modes from the same filter run.

A special option of historical filtering should be available: obtaining the last quotes and their results when the analysis reaches the most recent available quote. It should be possible to "flush" the full-quote window (of the dominant filtering hypothesis) for that purpose, even if the credibilities of its newest quotes are not finally corrected.

This leads to another timing mode that might frequently occur in practice. A real-time filter might be started from historical data. In this case, we start the filter in historical mode, flush the full-quote window as soon as the filter time reaches real time and then continue in real-time mode. This can be implemented as a special, combined mode if such applications are likely.

5. Special Filter Elements

The previous sections, explain the standard filter algorithm which is good for covering a large set of typically occurring outliers. However, since some data errors are of a very special nature, we need specialized filter elements for efficiently catching these errors.

The special filter elements use the same filtering structure as the standard filter algorithm, e.g., the scalar filtering window as defined by section 2 and are readily integrated into the standard filter. Descriptions of the individual filter elements follow.

a. Filtering Monotonic Series of Quotes

In several time series, mostly FX, the following phenomenon can be observed overnight or mostly during weekends. A contributor posts a monotonically increasing (or decreasing) series of quotes, starting at an acceptable quote level, often at a rather high frequency, e.g., 1.3020/25, 1.3021/26, 1.3022/27, 1.3023/28, . . . . The first few quotes look acceptable, but the quote level will be very far from the true level if the monotonic series is long. The motivation for this casually occurring quoting behavior can only be guessed; it is probably testing the performance and the time delay of the connection to the data service.

The standard filter is not very suited to properly analyzing this bad quoting behavior because the individual quote-to-quote changes look harmless, just 1 basis point in the given example. Even the value change over several quotes is not large enough to ensure proper action of the filter. After a long monotonic series of fake quotes, the filter may even give low credibility to the following correct values as these are far away from the end values of the monotonic series.

If the contributor of the monotonic series stands alone, it is not hard to detect the unnatural linearity of these quotes. Unfortunately, a bad habit has become very widespread among contributors to multi-contributor quote feeds: copying of quotes. The copied quotes are often modified by simple post-processing steps such as averaging of a few recent quotes, a small random value change and/or a small random time delay. The frequent posting of copied quotes seems to be motivated by the desire of the issuers to advertise their market presence. Together, the many copied and modified quotes make the monotonic series appear valid because they accompany it in a slightly irregular, less monotonic way, seemingly confirmed by many "independent" contributors.

The following algorithm is used to identify and filter monotonic series of fake quotes under the described, difficult circumstances. The framework of this algorithm is the scalar filtering window as explained by section 2; the algorithm is simply added to the other computations of the scalar filtering window. First the weight of the positive value changes from old quotes to the new quote is computed:

$$S_+ = \sum_{j=i-n}^{i-1} w_{ij} \delta_{x_i > x_j} \qquad (8.1)$$

where $\delta_{x_i > x_j} = 1$ in case of an up move, otherwise 0. We also do this for the negative value changes, $$S_- = \sum_{j=i-n}^{i-1} w_{ij} \delta_{x_i > x_j} \qquad (8.2)$$

and the sum of weights:

$$S = \sum_{j=i-n}^{i-1} w_{ij} \qquad (8.3)$$

The weight is defined to emphasize the comparison to the most recent quotes from the same contributor:

$$w_{ij} = \frac{1.1 - I_{ij}}{4 + (i-j)^2} \qquad (8.4)$$

where $I_{ij}$ is given by eq. 4.23.

The share of positive movements is given by the following formula which is a simple EMA iteration:

$$S'_{+,j} = \frac{2.5}{2.5 + S_+ + S_-} S'_{+,i-1} + \frac{S_+ + S_-}{2.5 + S_+ + S_-} S_+ \qquad (8.5)$$

The negative movements have the complementary share because zero changes are ignored here:

$$S'_{-,i} = 1 - S'_{+,i} \qquad (8.6)$$

At the very beginning, $S'_{+,0}$ and $S'_{-,1}$ are initialized to 0.5. $S'_{+,0}$ and $S'_{-,i}$ lead to the direction balance $B_i$:

$$B_i = \frac{f^4 \min(S'_{-,i}, = S'_{+,i}) + 1}{f^4 + 2} \qquad (8.7)$$

In case of low-frequency data, e.g., with a "crawling peg" (a case of a "natural" monotonic move), the direction balance is made less extreme in eq. 8.7 using the quote frequency f:

$$f_i = 0.1 A_i^2 \qquad (8.8)$$

where $A_i^2$ is measure of the recent mean distance between two quotes with a non-zero value change, computed by an EMA iteration similar to eq. 8.5:

$$A_i = \frac{2.5}{2.5 + S_+ + S_-} S'_{+,i-1} + \frac{S_+ + S_-}{2.5 + S_+ + S_-} \sqrt{\Delta \vartheta \text{nonZero}} \qquad (8.9)$$

$\Delta \Theta_{nonZero}$ is the age of the last quote value different from $x_i$, seen from time $\Theta_i$, measured in days of $\Theta$-time.

If the obtained direction balance is very poor (low value of $B_i$), we suspect monotonic quoting. The following maximum value of the trust capital $T_i$ of the new quote is defined:

$$T_{i,monoton} = 25 - \frac{0.001 B_i^4 \sqrt{f_{rel}}}{a^2} \qquad (8.10)$$

with the recent relative quote frequency $f_{rel}$ $$f_{rel} = f_i / d_i \qquad (8.11)$$

where $d_i$ is the current quote density as computed by eq. 4.15. The expected activity of the market is also needed:

$$a = \frac{\Delta \vartheta_i}{\Delta t_i} \qquad (8.12)$$

This activity, the ratio between two different measures of the last quote interval (once in $\Theta$-time and once in physical time), is very low on holidays and weekends, often leading to a strongly reduced trust in eq. 8.10. This is intentional and successful in tests as monotonic quoting is a problem mainly in market periods of low liquidity. According to eq. 4.25, a has a value of 0.01 on holidays and weekends; otherwise the value can go up to 3.4 depending on the activity and weight of different markets.

Under normal circumstances, $T_{i,monoton}$ has a high value. In the special situation of $T_{i,monoton}$ being less than the trust capital $T_i$ obtained by eq. 5.8, $T_i$ is replaced by $T_{i,monoton}$ and "monotonic quoting" is established as the filtering reason of the new quote.

b. Filtering Long series of Repeated Quotes

As explained above, some contributors let their computers repeat a quote many times. If this happens hundreds or thousands of times, the repeated quotes may obstruct the filtering of good quotes from other contributors. Very long series of repeated quotes cannot be tolerated.

Filtering repeated quotes by one contributor seems to be easy. However, there are three difficulties:
1. contributor IDs may not be available;
2. repeated quotes may be mixed with other quotes;
3. repeated quotes may be "natural" in a certain market.

The latter case is found in markets where quote values are denominated with coarse granularity, e.g., in Eurofutures where the lowest resolution (=granule) is of one basis point. Repeated Eurofutures quote values, also from different contributors, are quite normal.

If the filtered scalar is a bid-ask spread, repeated quotes are also natural. We do not conduct any repeated-quote analysis for bid-ask spreads; the following explanation applies to bid, ask or single-valued quotes only.

The repeated-quote analysis is done for scalar quotes in the framework of the scalar quote window as presented in section 2. This analysis is thus located at the same place as that of monotonic quotes as discussed in section 5.a. These two algorithms share a part of their variables and computations.

As a first step, the length of the sequence of repeated quotes is measured by the following counting formula:

$$n_{zero,i} = n_{zero,i-1} + \frac{S - S_+ - S_-}{S} \quad (8.13)$$

This is not a simple counter but rather a cumulator of the variable $(S-S_+-S_-)/S$ based on eqs. 8.1-8.3. This variable is a weighted measure of very recent zero changes, emphasizing quotes from the same contributor. By using this variable, the analysis can detect repeated quotes also if they are mixed with others. At the very beginning, $n_{zero,0}$ is initialized to 0. Whenever $(S-S_--S_-)/S$ is less than a threshold value, the sequence of repeated quotes is regarded as terminated and $n_{zero,0}$ is reset to 0.

The obtained length $n_{zero,0}$ of the sequence has to be put into the context of the quoting granularity. If the granule (=minimum size of a usual value change) is high as compared to the mean value change from quote to quote, high values of $n_{zero,0}$ are natural, and the filter should accept this. The granule size of each market may be configured as a nominal value. However, we prefer to determine the typical granule size in an adaptive way. This has the advantage of measuring the actual practice rather than formal conventions; changes of granularity are followed in an adaptive way.

The granularity is measured by an interesting algorithm that would deserve a detailed discussion. However, this is not a central issue of filtering, so we just give the resulting formulas. The computation is based on moments of the value change distribution function where the exponent of the moments is negative. All zero changes thus have to be excluded from this computation. Negative exponents emphasize small value changes, i.e. those that are close to the typical granule size. The moment with exponent $-k$ is computed with the help of the following moving average iteration:

$$m_{-k,i} = \mu_m m_{-k,i-1} + (1-\mu_m)|\Delta x_i|^{-k} \quad (8.14)$$

where $\Delta x_i$ is the value change from the last quote and the coefficient $\mu_m$ determines the memory of $m_{-k,i}$. Eq. 8.14 can also be seen as an EMA iteration according to (Zumbach and Müller), on a time scale that ticks with every quote with a non-zero value change. This iteration is applied to only valid quotes with a non-zero value change as they are dismissed from the scalar quote window, see section 2.d.ii. At the first quote that brings a non-zero value change $\Delta x_i$, $m_{-k,i}$ is initialized to $|\Delta x_i|^{-k}$. Before this initialization (when starting from scratch), $m_{-k,i}$ cannot be used and the repeated-quote analysis is not yet operational. Numerous tests with granular (discrete) model distributions such as binomial distributions (also some more fat-tailed distributions) have shown that the following formula gives a good estimate of the granule g:

$$g = \frac{m_{-1/2,i}^2}{m_{-2,i}} \quad (8.15)$$

Thus we use the moments with exponents $-\frac{1}{2}$ and $-2$. When starting a filter run from scratch, $m_{-1/2,i}$ and $m_{-2,i}$ are not yet available for a short period, so g is undefined. The repeated-quote analysis can be done only after this period.

Now we need the natural probability of a zero change, given a certain distribution function and the granule size g. The same tests that led to eq. 8.15 also lead to another heuristic approximation formula of the probability of zero changes:

$$P_{zeroChange} = e^{4.2(gm_{-1/2}^2 - 1)} \quad (8.16)$$

This formula (which is not yet our end result) is conservative: it overestimates $p_{zeroChange}$ mainly for small granules (where $p_{zeroChange}$ goes to 0). This is what we want here.

In fact, we have $n_{zero,i}$ changes in a row, not just one. The probability of this is much smaller:

$$p_{nZeroChange} = p_{zeroChange}^{n_{zero,i}} = e^{4.2 n_{zero,i}(gm_{-1/2}^2 - 1)} \quad (8.17)$$

Now we formulate a maximum trust capital for repeated quotes whose value, when converted to a credibility according to eq. 4.1, corresponds to $p_{nzeroChanges}$ in the limit of low credibility:

$$T_{i,repeated} = 25 - 0.5 P_{nZeroChangees}^{-0.32} \approx 25 - 0.5 e^{1.35 n_{zero,i}(gm_{-1/2}^2 - 1)} \quad (8.18)$$

This maximum trust capital is much higher than the theoretical value postulated before: there is a large positive offset of 25, and the exponent $-0.32$ (instead of $-0.5$) dampens the effect of a high number $n_{zero}$ of repeated quotes. $T_{i,repeated}$ is a conservative estimate; if we get low trust, we can be sure that the series of repeated quotes is unnatural in the given market. It must be the result of thoughtless repetition, probably by a computer.

Eventually, we compare $T_{i,repeated}$ to the normal trust capital $T_i$ of the quote. $T_i$ results from eq. 5.8 and is assumed to be already corrected after a comparison to $T_{i,monoton}$ (from eq. 8.10). If $T_{i,repeated}$ is less than $T_i$, we replace $T_i$ by $T_{i,repeated}$ and set "long repeated series" as the filtering reason of the quote.

c. Disruptive Events and Human Intervention

The filter as described so far is adaptive to a wide range of different financial instruments and also adapts to changes in the behavior of these instruments. Adaptation needs time—it means adapting to statistical results which have a certain inertia in their behavior by definition. The volatility measure of eq. 4.16, for example, has a range $\Delta\Theta_r$ of 7 days. Thus the filter cannot immediately adapt to a disruptive event that leads to an extreme, unprecedented behavior in few hours.

Disruptive events are rare events. There are some additional filtering elements to cover them. Disruptive events can be sorted in three types:

1. Scaling change: a financial instrument quoted with a changed scale factor. Examples: a stock split or the re-definition of units of an instrument. These changes result in a sudden change of quote values by a constant factor, often but not always by a power of 10. This does not imply any market shock or change in volatility.
2. Change in the instrument definition: a financial instrument undergoes a substantial change of its definition, not only in scaling. Example: Benchmark bonds are quoted as the underlying instrument of certain bond futures. When they approach maturity, they are replaced by another bond, but the quotes appear in the same, uninterrupted time series. This implies a sudden jump in value, but the volatility of the new bond on the new level is not fundamentally different from the old one.
3. Regime change: the regulation of financial instruments can be changed. Example: the floating regime of the Brazilian Real after a long period of a fixed rate to the USD. Regime changes of this kind have two effects:
(a) a sudden move to a new level (e.g., devaluation of the Brazilian Real),
(b) very high volatility of oscillations around the new level.

These two effects together make filtering difficult. The most extreme, unexpected market shocks can behave similarly to a regime change. Inverse regime changes—from floating to fixed—are no real problem for the filter. These changes are usually anticipated by a quiet market behavior, so the normal filter can well adapt.

The filter user has the following means to deal with disruptive events:
  Anticipation by opening a new time series: many disruptive events such as definition and regime changes are announced in advance. A newly defined Russian Ruble, for example, is a new time series and should be treated as such: it should get its own, independent filter. Thus each filter sees data either only following the old definition or the new one.
  Human intervention: re-starting the filter immediately after the disruptive event. This is a viable, though not elegant solution, given the rarity of disruptive events and the difficulty of implementing a satisfying on-line solution.
  Anticipation by on-line warning message: the user can send a warning message to the filter, informing it on an imminent change of scaling factor or volatility shock.
  Human on-line correction: the user can tell the filter to accept a certain quote or approximate quote level after the disruptive event.

The last two features are not yet implemented. We rely on off-line human intervention in the rare case of a disruptive event.

The filter should treat disruptive events as well as possible even without human intervention. It has the following means:
  Reacting to human messages: in case of a warning message, the filter can be prepared to the imminent event, e.g., by lowering the dilution factor $\mu$ as discussed in section 2.b.ii. A human correction can be used to modify the stored trust capitals of the scalar filtering queue. This is not yet implemented as explained above.
  Immediate detection and adaptation: some disruptive events follow from the analysis of a side variable of the quote. This is implemented in the O & A filter as explained in section 5.c.ii.
  Delayed detection: a disruptive event may initially result in an unusually long series of rejected quotes after the change. This fact can be used to inform the user of possible problem. The filter may either send a special warning to the user, or an independent monitoring tool may produce this warning.
  Delayed adaptation: eventually, the filter will adapt to the new regime after the disruptive event. This is ensured by the adaptivity and the time-out of the scalar filtering window.

Disruptive events are not a problem of the filter alone. Their treatment also depends on the application, the environment and the goals of the filter user.

The three types of disruptive events are further discussed in the following sections.

i. Scaling Change

Scaling changes are often caused by real economic facts. If these can be anticipated, the filter user should prepare the filtering of newly scaled quotes in advance. However, some scale changes may come by surprise.

Here are some examples:
  Changing quoting habits: Norwegian banks used to quote the value of 100 DEM in NOK. Later, they preferred quoting the value of 1 DEM in NOK.
  Re-definition of units: one new Russian Ruble is re-defined to be 1000 old Rubles.
  The French stock index (CAC4O) is quoted in Euros instead of French Francs.
  Stock splits: one old share is split into three new shares of the same company.

The first examples usually cause a scale factor that is a power of 10 with an integer exponent. The filter deals with such factors as described in section 4.b. The last examples usually have odd scale factors different from a power of 10. In this case, the user has to intervene, e.g. by opening a new time series and a new filter for the newly scaled quotes.

ii. Change in the Instrument Definition

Changes in the instrument definition are rare, but there is one instrument where they regularly occur: benchmark bonds. Benchmark bonds are quoted as the underlying instrument of certain bond futures. When they approach maturity, they are replaced by another bond, but the quotes appear in the same, uninterrupted time series. The change of the maturity results in a value jump.

Fortunately, the maturity of a benchmark bond is available from the data source. This information can be used for an immediate detection of and adaptation to the new definition. The program used for filtering benchmark bonds is continuously checking the maturity before passing the corresponding quote to the filter. As soon as it detects a change of the maturity, it calls a special function.

This new-definition function acts on all scalar filtering windows. For all scalar quotes in all scalar filtering windows, the stored age is incremented by 1+5/d days, where d is the quote density per day as computed by eq. 4.15; this leads to a higher expected volatility. At the same time, the valid-quote age $Q_j$ of all these scalar quotes is incremented by 15; this can also lead to a higher expected volatility through eq. 4.19. By virtually pushing all old quotes into the past, the filter becomes more tolerant to the sudden value change to follow, without accepting bad outliers.

The new-definition function can be used for any new definition of any instrument, it is not restricted to benchmark bonds.

iii. Regime Changes and Extreme Market Shocks

Regime changes and extreme market shocks imply sudden outbursts of quoted values and their volatility. The standard filter already has a means to deal with this phenomenon: the dilution mechanism explained in section 2.b.ii. An alternative trust capital $T''_i$ of a scalar quote is computed in case of a value jump. If $T''_i$ fulfills the condition of eq. 5.8, the value jump is quickly accepted.

Unfortunately, this mechanism stops working if the market shock is extreme, i.e., the volatility becomes several orders of magnitude higher than the historical value, and if the volatility stays high also after the initial jump. One remedy would be to choose a lower dilution factor $\mu$. This cannot be a general solution as it would lead to accepting too many ordinary outliers.

Optimal filtering of regime changes and extreme market shocks is a subject of on-going research. Meanwhile, the filtering of regime changes and extreme market shocks may require human intervention.

d. Multivariate Filtering—An Idea for Filtering Sparse Quotes

Multivariate filtering requires a more complex and less modular software than univariate filtering—but it seems the only way to filter very sparse time series with very unreliable quotes. A possible implementation is as follows.

In the financial markets, there is a quite stable structure of only slowly varying correlations between financial instruments. In risk management software packages, a large, regularly updated covariance matrix is used to keep track of these correlations.

Covariance matrices between financial instruments can also be applied in the filtering of sparse quotes. Univariate filtering methods are working well for dense quotes. If the density of quotes is low, the methods lose a large part of their power. When a new quote of a sparse series comes ib, we have only few quotes to compare; these quotes can be quite old and thus not ideal for filtering. This is the place where some additional information from the covariance matrix becomes useful. This can technically be done in several ways.

The only method outlined here is the artificial quote method. If the sparse rate (e.g., in form of a middle price) is included in a covariance matrix that also covers some denser rates we can generate some artificial quotes of the sparse series by exploiting the most recent quotes of the denser series and the covariance matrix. The expectation maximization (EM) algorithm (Morgan Guaranty, 1996) is a method to produce such artificial quotes; there are also some alternative methods. The best results can be expected if all the series included in the generation of an artificial quote are highly correlated or anticorrelated to the sparse series.

Artificial quotes may suffer from three uncertainties: (1) they have a stochastic error in the value because they are estimated, (2) there is an uncertainty in time due to asynchronicities in the quotes of the different financial instruments (Low et al., 1996), (3) only a part of the full quote is estimated from the covariance matrix (e.g., the middle price, whereas the bid-ask spread has to be vaguely estimated as an average of past values). Therefore, an additional rule may be helpful: using artificial quotes only if they are not too close to good quotes of the sparse series.

In some cases such as FX cross rates, we can simply use arbitrage conditions to construct an artificial quote (e.g. triangular currency arbitrage); a covariance matrix is not necessary there.

The following algorithmic steps are done in the artificial quote method:
- define a basket of time series which are denser than the sparse series and fairly well correlated or anticorrelated to it (radical version: a basket of all financial instruments);
- generate artificial quotes from the correlation matrix and mix them with the normal quotes of the sparse series, thus reinforcing the power of the univariate filtering algorithm;
- eliminate the artificial quotes from the final output of the filter (because a filter is not a gap-filler).

This algorithm has the advantage of leaving the univariate filtering algorithm almost unchanged; the multivariate element enters only in the technical form of quotes which already exists in univariate filtering. The disadvantage lies in the fact that the artificial quotes may be of varying, uncertain quality (but better than none at all).

6. Initialization, Termination, Checkpointing a. Filter Initialization

Usually, there is a requested start time of the filtered data sequence. The filter needs to see some data before this start in order to work reliably: it needs a build-up period. A build-up is technically identical to a normal filter run; the only difference is that the filtering results of the individual quotes are not accessible to the end user.

The adaptive filter contains some elements based on iterations, mostly EMAs (exponential moving averages). These variables must be properly initialized. At the very beginning of a filtering session, the initial values are probably rather bad, so the filter has to run for a while to gradually improve them. Moreover, the windows are initialized to be empty, so the first quotes will also have shaky credibility values due to the insufficient window size.

Thus the filter initialization over a build-up period is absolutely necessary; it is not just an option.

The build-up period must have a sufficient size, the longer the better. A size of 2 weeks is a minimum; we recommend a build-up period of at least three months. Extremely sparse data needs an even longer build-up, for obvious reasons.

Thus, the filter is a tool for a sequential analysis, not for random access. If random access to filtered data is an issue, we recommend storing sequentially filtered data and its filtered results in a database and then retrieving data from there.

The timing of the build-up period is also essential. The best choice of the build-up period is the time interval immediately preceding the starting point from which the filtering results are needed. In this normal case,
1. the filter is started from scratch at start time minus the build-up period;
2. filtering results are ignored until the analysis reaches the start time;
3. normal filter operation starts at this start time.

This is not possible if the start time of the filter is close to the beginning of available data. In this exceptional case, we take the second best choice, a more complicated start-up procedure:
1. start the filter from the beginning of available data;
2. run it over a full build-up period;
3. ignore filtering results until the analysis reaches the end of build-up;
4. keep the values of all statistical variables (this is what the adaptive filter has learned from the data), either in memory or in a checkpoint file;
5. re-start the filter, again from the beginning of available data, but profiting from the statistical variables already built up;
6. ignore filtering results until the analysis reaches the desired start time of the filtering session;
7. reach the state of normal filter operation at this start time.

The statistical variables at the end of a build-up can be stored in a checkpoint file. This is explained in section 6.3. A filter reading from a well-chosen checkpoint file needs no build-up.

The initialization of a new financial instrument, such as a futures contract with a new expiry time, can be improved by starting its filter from a checkpoint file generated by the filter of a similar instrument such as a corresponding futures contract with an earlier expiry. This is important in real time when the new instrument does not yet have sufficient data for a regular build-up.

b. Filter Termination

The termination of a filter run poses no problems. If the filter run is a build-up or could be a build-up for another run, a last checkpoint file should be written.

In the case of historical filtering, some quotes and their provisional results are still buffered in the filtering windows. A user may want to either continue filtering for a while to get the last quotes before termination time or simply flush the buffers.

c. Checkpointing

A checkpoint is a set of variable values that determine the state of a filter. All the statistical variables needed for adaptivity belong to this set. Checkpoints are written to files, in some time intervals, e.g., one checkpoint a day. The user program may also want to write additional checkpoints on request. Several checkpoints are kept for safety. Checkpoint files have to be managed by the user or the program using the filter. Their name or header should contain date and time of the last entered quote.

The main reason to introduce checkpointing is a gain of time. A checkpoint is a starting point for a quick start. Checkpointing is related to the build-up. A checkpoint written at a quote time exactly at or slightly before the desired starting point of the filter run can replace a new build-up. The filter simply reads the checkpoint file and initializes the variables accordingly. On the other hand, the build-up procedure can replace checkpointing and make it superfluous. This however implies that every filter run, also in a real-time application, must be preceded by a lengthy build-up. Only few users will accept such an amount of additional computation time. For most users, checkpointing is compulsory.

In filtering, there are two possible concepts of checkpointing:

1. Strong checkpointing: Storing all the variables that determine the state of the filter: not only the statistical variables but also the full-quote and scalar filtering windows with all their quotes and relevant results of these quotes. Strong checkpoints thus take a lot of storage space.
2. Weak checkpointing: storing only the statistical variables needed for adaptivity. (Olsen & Associates' weak checkpointing additionally includes some condensed information on a "last valid" quote).

Both are implemented in our filter. The Olsen & Associates' data collector uses weak checkpointing for storage space reasons: the strong checkpoints of all the very many collected instruments would take an unwieldy amount of space. The storage size also depends on the format: human-readable ASCII or binary (which is more compact).

The filter is immediately and fully operational after starting from a strong checkpoint. When starting from a weak checkpoint, the filtering windows are empty, so the filter is not immediately operational. We need an additional "mini"-build-up to fill the windows with a sufficient amount of good quotes before the true filtering start, in order to prevent a bad start from outlier quotes. This is a disadvantage of weak checkpointing. Olsen & Associates' weak checkpoints therefore include a "last valid" quote which is the most recent among the good quotes from the full-quote filtering window at the time when the checkpoint was written. At start from a weak checkpoint, this last valid quote is used to initialize the filtering windows. More precisely, this quote (i.e., its scalar quotes) enters a special window of old valid quotes that was initially introduced for another purpose as explained in section 2.d.iii. This is an acceptable, pragmatic solution though not as good as strong checkpointing.

Another reason to introduce checkpointing is related to the information content of the checkpoint files. Human readers can obtain some insight into the filter status by looking at checkpoint files. To make this possible, checkpoints should be human-readable, either directly or through a tool in the case of encoded (binary) checkpoint files. In this sense, checkpoints are also a diagnostic tool, see section 7.1.

In summary, checkpointing is an almost absolute necessity. It can be avoided only under two conditions: (1) always tolerating slow initialization due to long build-up periods and (2) introducing diagnostic tools other than checkpointing.

7. Miscellaneous Features of the Filter a. Diagnostics

Some users may want to know the current state of the filter while it is running in real time. Three possible solutions are proposed: (1) looking at the most recent regularly produced checkpoint file; (2) adding a feature to produce checkpoint files on demand; (3) adding a feature to produce diagnostic messages in text form on demand.

We have implemented solution (1) with a tool to convert the weak checkpoints from binary to text format.

b. Statistics

Statistical information is useful to characterize the behavior of a filter. Even a user who does not understand the filter in its full complexity will still want to know simple statistical properties such as the rejection rate, the percentage of rejected quotes. The required statistical analysis is not necessarily identical to that internally used by the adaptive filter algorithm. Typical rejection rates are below 1% for major financial instruments and can be above 10% for some minor instruments with bad coverage and bad quoting discipline.

A tool to produce some standard, user-friendly statistical filtering information should be implemented as a part of the of the wider filtering environment. Such a tool cannot be part of the filter because it also has to manage the access to the data.

c. Testing

Testing plays a key role in the filter development. The correct operation has to be tested as for every piece of software. The role of testing extends far beyond this. Testing is also needed to fine-tune the many parameters of the filter. The values recommended for all the many parameters of the filter in this document are results of our tests.

The behavior of the filter has to be tested for very different data and error types. Examples of all the special errors have to tested. Few automatic testing tools can help. From filtering statistics, we can identify instruments and periods with high rejection rates and uninterrupted series of rejected quotes. These often (but not always) indicate remaining problems of a certain filter version. Finally, we can compare two filter versions by looking at differences in the results, highlighting and studying only those quotes where a large difference in credibility was found. These methods have been used to fine-tune our filter.

Another part of testing was done in the framework of Olsen & Associates' own data collection which can be seen as a huge real-life testing environment of the filter.

d. User-defined Filtering

Users have several ways to influence the behavior of the filter, if they wish so. They can choose the credibility threshold for accepted quotes different from the recommended value 0.499. They can change the recommended values of the many parameters of the filter. A higher value of $\xi_0$ in eq. 4.11, for example, will lead to a more tolerant filter.

In section 5.c, we have proposed some means to influence filtering through direct intervention.

8. Summary of Filter Parameters

The filter algorithm as a whole is complicated and depends on many configuration parameters. The definitions and explanations of all these parameters are scattered in the text. A central list of all parameters is therefore helpful; Table 5 is such a list.

The parameters are listed in the sequence of their appearance in the document. Some less important parameters have no symbol and appear directly as numbers in the text; nevertheless they have been included in Table 5. The important parameters (with their own symbols, of course) determine the character of the filter. Filter users may choose the parameter values in order to obtain a filter with properties suited to their needs.

TABLE 5

| Description of parameter | Symbol | Equation number |
|---|---|---|
| Range of mean x | $\Delta\theta_r$ | 4.3, 4.4 |
| Parameters of $\Delta x_{min}^2$ used in the level filter | | (after eq. 4.7) |
| Critical deviation from mean x | $\xi_0$ | 4.8 |
| Critical size of value change | $\xi_0$ | 4.11 |
| Interaction range in change filter (normal value, special value for bid-ask spread) | $\nu$ | 4.13 |
| Range of quote density | $\Delta\theta_r$ | 4.15 |
| Weight of new quote in quote density (normal value, special value for repeated quotes) | $c_d$ | 4.15 |
| Range of short-term, standard and long-term volatility ($\nu_{fast}$, $\nu$, $\nu_{slow}$) | $\Delta\theta_r$ | 4.16 |
| Relative time interval offset for volatility | $d_0$ | 4.17 |
| Absolute time interval offset for volatility | $\delta\theta_{min}$ | 4.17 |
| Relative limits of quote interval $\Delta\theta$(upper, lower) | | 4.19 |
| Weight of squared granule in volatility offset | | 4.21 |
| Parameters used for volatility offset $\epsilon_0$ for bid-ask spreads | | (after eq. 4.21) |
| Exponent of 1 − D in the formula for the impact of quote diversity | | 4.24 |
| Other parameters of the impact of quote diversity | | 4.24 |
| Activity of active periods, for $\theta_k$ | | 4.25 |
| Activity of inactive periods, for $\theta_k$ | | 4.25 |
| Range of short-term volatility used for $\theta$ | $\Delta\theta_{smooth}$ | 4.28 |
| Range of the variance of volatility fluctuations used for $\theta$ | $\Delta\theta_r$ | 4.29 |
| Weight of the level filter | $c_{level}$ | 5.2 |
| Trust capital dilution factor (normal value, special value at initialization from scratch) | $\mu$ | 5.4-5.6 |
| Window size parameter | W | 5.13 |
| Critical credibility for statistics update (normal value, special value at initialization from scratch) | $C_{crit}$ | (section 5.4.2) |
| Lower limit of allowed domain (prices, FX forwards, interest rates) | $p_{min}$ | 6.1 (+ section 6.2) |
| Factor in transformation of bid-ask spreads | | 6.2 |
| Maximum quote interval size in decimal error | | (section 7.1) |
| Parameters of trust capital test for accepting a decimal error | | 7.1 |
| Parameters of trust capital test for terminating a decimal error | | 7.2 |
| Trust capital limits of old scale factor (factor 10 or 0.1, other factor) | | 7.3 |
| Trust capital advantage of new scale factor (factor 10 or 0.1, other factor) | | 7.4 |
| Standard credibility threshold for accepting a quote | | (sections 7.3, 10.4) |
| Many parameters of the filter of monotonic quotes | | 8.4-8.10 |
| Memory (related to sample range) of moments | $\mu_m$ | 8.14 |
| Parameters of the maximum trust capital of repeated quotes | | 8.18 |

The following documents are incorporated herein by reference:

Dacorogna M. M., Müller U. A., Nagler R. J., Olsen R. B., and Pictet O. V., 1993, *A geographical model for the daily and weekly seasonal volatility in the FX market*, Journal of International Money and Finance, 12(4), 413-438.

Fowler M. and Scott K., 1997, *UML Distilled Applying the Standard Object Modeling Language*, Addison-Wesley.

Guillaume D. M., Dacorogna M. M., Davè R. D., Müller U. A., Olsen R. B., and Pictet O. V., 1997, *From the bird's eye to the microscope: A survey of new stylized facts of the intra-daily foreign exchange markets*, Finance and Stochastics, 1, 95-129.

Low A., Muthuswamy J., and Sarkar S., 1996, *Time variation in the correlation structure of exchange rates: high frequency analyses*, Proceedings of the Third International Conference on Forecasting Financial Markets, London, England, Mar. 27-29, 1996, 1, 1-24.

Morgan Guaranty, 1996, *RiskMetrics™—Technical Document*, Morgan Guaranty Trust Company of New York, N.Y., 4$^{th}$ edition.

Müller U. A., Dacorogna M. M., and Pictet O. V., 1998, *Heavy tails in high-frequency financial data*, published in the book "A practical guide to heavy tails: Statistical Techniques for Analysing Heavy Tailed Distributions", edited by Robert J. Adler, Raisa E. Feldman and Murad S. Taqqu and published by Birkhäuser, Boston 1998, 55-77.

Zimmermann, H. J., 1985, *Fuzzy Set Theory—and Its Applications*, Kluwer-Nijhoff Publishing, Boston-Dordrecht-Lancaster.

What is claimed is:

1. A method of filtering time series financial data comprising the steps of:
testing said data for decimal error;
testing said data for scaling error;
testing said data for domain error;
testing for credibility of said data that passes the tests for decimal error, scaling error and domain error by comparing nearby data in the time series; and
rejecting by a computer an item of data that fails the testing for decimal error, scaling error, domain error and credibility.

2. The method of claim 1 further comprising the step of testing for a monotonic series of quotes in the time series data and rejecting such quotes when detected.

3. The method of claim 1 further comprising the step of testing for a long series of repeated quotes in the time series data and rejecting such quotes when detected.

4. The method of claim 1 wherein the step of testing said data for decimal error comprises the step of testing if an absolute value of a difference between a new quote and a previous quote in the time series data is within a predetermined value of the next power of ten.

5. The method of claim 4 wherein the step of testing said data for decimal error further comprises the step of testing if a time interval between the new quote and the previous quote is less than a predetermined time.

6. The method of claim 5 wherein the predetermined time is 70 minutes.

7. The method of claim 1 wherein the time series data is a series of quotes and the step of testing for decimal error comprises the steps of:
testing for a decimal error in a quote,
computing a corrected quote if a decimal error is detected, and
testing the corrected quote for validity.

8. The method of claim 1 wherein the time series data is a series of quotes and the step of testing for decimal error comprises the steps of:
testing for a decimal error in a quote,
computing a corrected quote if a decimal error is detected,
testing the corrected quote for credibility, and
comparing the credibility of the corrected quote with the credibility of the quote in which the decimal error was detected.

9. The method of claim 1 wherein the step of testing said data for domain error comprises the step of testing for an illegal value of the time series data.

10. The method of filtering time series data of claim 1 wherein the time series data is a series of quotes and the quotes are tested for credibility relative to the quotes within a time window.

11. A method of filtering a time series of quotes comprising the steps of:
    testing said quotes for decimal error,
    testing for credibility of said quotes by comparing nearby quotes in the time series,
    rejecting by a computer a quote that fails the tests for decimal error and credibility,
    testing if a ratio of a new quote and a previous quote lies within a predetermined range; and
    if the ratio does not lie within the predetermined range, changing the ratio by a power of ten until the changed ratio lies within the predetermined range.

12. The method of claim 11 further comprising the step of testing said quotes for at least one of scaling error and domain error.

13. The method of claim 11 further comprising the step of testing for a monotonic series of quotes in the time series of quotes and rejecting such quotes when detected.

14. The method of claim 11 further comprising the step of testing for a long series of repeated quotes in the time series of quotes and rejecting such quotes when detected.

15. The method of claim 11 wherein the quotes are tested for credibility relative to the quotes within a time window.

16. The method of claim 11 wherein the step of testing said quotes for decimal error comprises the step of testing if an absolute value of a difference between a new quote and a previous quote in the time series of quotes is within a predetermined value of the next power of ten.

17. The method of claim 11 wherein the step of testing said quotes for decimal error further comprises the step of testing if a time interval between the new quote and the previous quote is less than a predetermined time.

18. The method of claim 11 wherein the step of testing for decimal error comprises the steps of:
    testing for a decimal error in a quote,
    computing a corrected quote if a decimal error is detected, and
    testing the corrected quote for validity.

19. The method of claim 11 wherein the step of testing for decimal error comprises the steps of:
    testing for a decimal error in a quote,
    computing a corrected quote if a decimal error is detected,
    testing the corrected quote for credibility, and
    comparing the credibility of the corrected quote with the credibility of the original quote.

20. The method of claim 1 wherein the time series data is a series of quotes and the step of testing said data for scaling error comprises the steps of:
    testing if a ratio of a new quote and a previous quote lies within a predetermined range; and
    if the ratio does not lie within the predetermined range, changing the ratio by a power of ten until the changed ratio lies within the predetermined range.

21. The method of claim 20 wherein the range is between $\sqrt{0.1}$ and $\sqrt{10}$.

22. The method of claim 11 further comprising the step of testing for an illegal value of quotes in the time series of quotes.

23. The method of claim 11, wherein the range is between $\sqrt{0.1}$ and $\sqrt{10}$.

24. The method of claim 1 wherein rejecting is made by identifying an item of data as bad.

25. The method of claim 1 wherein rejecting is made by eliminating from the time series data an item of data that is bad.

26. The method of claim 11 wherein rejecting is made by identifying a quote as bad.

27. The method of claim 11 wherein rejecting is made by eliminating from the time series of quotes a quote that is bad.

28. A method of filtering time series financial data comprising:
    assigning a numerical value of a credibility measure to each datum in a time series of quotes or transaction prices of financial instruments, and
    filtering out with a computer those data in the time series of quotes or transaction prices for which the assigned numerical value does not meet a predetermined value.

29. The method of claim 28 further comprising the preliminary step of detecting and correcting decimal errors in the time series of financial data.

30. The method of claim 28 further comprising the preliminary step of detecting and correcting scaling errors in the time series of financial data.

31. The method of claim 28 further comprising the preliminary step of eliminating domain errors in the time series of financial data.

32. The method of claim 28 wherein each quote or transaction price accumulates an additive Trust Capital based on various criteria resulting in a numerical quantity ranging from −Infinity to Infinity.

33. The method of claim 32 wherein the numerical value of the Credibility measure is computed from the Trust Capital as a monotonic mapping from the domain [−Infinity, Infinity] to the range [0,1].

34. The method of claim 28 wherein each quote or transaction price is assigned a credibility measure having a numerical value ranging from 0 to 1.

35. The method of claim 28 wherein the temporal distance of quotes is computed in a modified time scale in which epochs known a priori to be of high activity are contracted with respect to physical time and epochs known a priori to be of low activity are expanded with respect to physical time and wherein a normalization is applied such that the total hours per day or per week for the modified time scale matches physical time.

36. The method of claim 28 wherein the numerical value of the credibility measure, C(T), of a datum x is determined by $$C(T) = \frac{1}{2} + \frac{T}{2\sqrt{1+T^2}} \quad (4.1)$$

$$\text{where } T = 1 - \frac{\hat{x}_i^2}{k} \quad (4.6)(4.7)$$

$$\text{and } \hat{x}_i = \frac{x - \bar{x}}{\sqrt{EMA[t; (x-\bar{x})^2]}} \quad (4.3)$$

where $\bar{x}$ is the exponential moving average (EMA) of the data in the series of quotes or transaction preces in the time period t.

* * * * *